US012717705B2

(12) United States Patent
Holcomb et al.

(10) Patent No.: US 12,717,705 B2
(45) Date of Patent: Aug. 25, 2026

(54) AUTOMATED ARTIFICIAL INTELLIGENCE TEACHING AND LEARNING ENVIRONMENT SYSTEM AND METHOD

(71) Applicant: Textron Innovations Inc., Providence, RI (US)

(72) Inventors: Jeffrey W. Holcomb, Fort Worth, TX (US); Manjunath Maigur, Vijayapura (IN)

(73) Assignee: Textron Innovations Inc., Providence, RI (US)

( * ) Notice: Subject to any disclaimer, the term of this patent is extended or adjusted under 35 U.S.C. 154(b) by 212 days.

(21) Appl. No.: 18/437,363

(22) Filed: Feb. 9, 2024

(65) Prior Publication Data

US 2025/0258760 A1 Aug. 14, 2025

(51) Int. Cl.

| | |
|---|---|
| ***G06N 20/00*** | (2019.01) |
| ***G06F 11/3668*** | (2025.01) |
| *G06F 11/30* | (2006.01) |
| *G06N 3/0455* | (2023.01) |
| *G06N 3/0475* | (2023.01) |
| *G06N 3/0895* | (2023.01) |

(52) U.S. Cl.

CPC ...... *G06F 11/3692* (2013.01); *G06F 11/3684* (2013.01); *G06F 11/3688* (2013.01); *G06F 11/3051* (2013.01); *G06N 3/0455* (2023.01); *G06N 3/0475* (2023.01); *G06N 3/0895* (2023.01); *G06N 20/00* (2019.01)

(58) Field of Classification Search

CPC ............ G06F 11/3692; G06F 11/3684; G06F 11/3688; G06F 11/3051; G06N 3/0455; G06N 3/0475; G06N 3/0895; G06N 3/08; G06N 3/0483; G06N 3/0482; G06N 20/00

See application file for complete search history.

(56) References Cited

U.S. PATENT DOCUMENTS

| | | | | |
|---|---|---|---|---|
| 2023/0088561 A1* | 3/2023 | Ickin | ...................... | G06N 3/098 706/12 |
| 2023/0368077 A1* | 11/2023 | Yao | ........................ | G06N 20/00 |
| 2024/0070439 A1* | 2/2024 | Segars | ................... | G06N 3/094 |
| 2024/0370760 A1* | 11/2024 | Muhammad | ........... | G06N 20/00 |
| 2025/0148347 A1* | 5/2025 | Arora | ..................... | G06N 20/00 |

* cited by examiner

*Primary Examiner* — Anibal Riveracruz

(74) *Attorney, Agent, or Firm* — Slater Matsil, LLP

(57) ABSTRACT

A method for providing an automated AI teaching and learning environment includes selecting an AI agent from an AI agent pool as a candidate AI agent according to performance of the AI agent after previous training and further according to capability requirements for capability-based training, and providing the capability-based training for the candidate AI agent. Providing the capability-based training includes acquiring first training data, generating a trained artificial intelligence (AI) agent by training the candidate AI agent to have at least one capability associated with using the first training data, generating synthetic validation data different from the synthetic training data, validating the trained AI agent by performing validation testing on the trained AI agent using first validation data that includes the synthetic validation data, and providing the trained AI agent as a validated AI agent after the validating the AI agent.

20 Claims, 6 Drawing Sheets

AUTOMATED ARTIFICIAL INTELLIGENCE TEACHING AND LEARNING ENVIRONMENT SYSTEM AND METHOD

TECHNICAL FIELD

The present invention relates generally to a system and method for an automated machine teaching and learning environment, and, in particular embodiments, to a system and method for providing an automated training and certification environment for training artificial intelligence (AI) or machine learning (ML) agents using a modular and templatized system.

BACKGROUND

The training and certification of industrial grade AI/ML, for aerospace applications in particular is difficult and expensive. Concerns about AI/ML technologies have led government agencies, such as the European Union Aviation Safety Agency, to add requirements for learning process verification for training AI or ML agents.

However, the nature of AI and ML agents prevents the verifiability of the data used for the AI or ML agents themselves. This is because training of AI and ML agents involves adjusting weight and bias values for numerous filters using an iterative process. The adjustment of the weights and biases results in filters tuned by an algorithm, with the tuned variables being effectively in a black box. While the training data and resulting decisions or results from an AI or ML agent can be analyzed, the actual application of the tuned filters to perform data analysis is not analyzable.

SUMMARY

An embodiment system includes at least one processor, and at least one non-transitory computer readable memory connected to the at least one processor and including computer program code. The at least one non-transitory computer readable memory and the computer program code are configured, with the at least one processor, to cause the system to perform at least providing capability-based training for an artificial intelligence (AI) agent, where the cause the system to perform at least the providing the capability-based training includes cause the system to perform at least acquiring first training data, generating a trained artificial intelligence (AI) agent by training a candidate AI agent to have at least one capability using the first training data, generating synthetic validation data different from the first training data, validating the trained AI agent by performing validation testing on the trained AI agent using first validation data that includes the synthetic validation data, generating one or more pieces of synthetic system testing data, performing system testing on the trained AI agent after validating the AI agent and by testing the AI agent, using first system testing data that includes the synthetic testing data and that is different from the first training data and the first validation data, while the AI agent is integrated with a target hardware environment associated with hardware identified as a host system for the AI agent, and providing the trained AI agent as a validated AI agent after the validating the AI agent and after performing the system testing on the AI agent.

Another embodiment system includes at least one processor, and at least one non-transitory computer readable memory connected to the at least one processor and including computer program code. The at least one non-transitory computer readable memory and the computer program code are configured, with the at least one processor, to cause the system to perform at least providing each capability stack of a plurality of capability stacks, where each capability stack provides capability-based training for an artificial intelligence (AI) agent, and where each capability stack of the plurality of capability stacks is associated with AI training for a respective set of capabilities, where the instructions for providing each capability stack include, for each capability stack, instructions for generating a trained AI agent by training a candidate AI agent using first training data, where the training the candidate AI agent include training the candidate AI agent to have at least one capability that is of the respective set of capabilities associated with the respective capability stack, and validating the trained AI agent by performing validation testing on the trained AI agent using first validation data that includes at least some synthetic validation data different from the training data, selecting an AI agent from an AI agent pool as a candidate AI agent according to performance of the AI agent after previous training, selecting an active capability stack from the plurality of capability stacks according to the set of capabilities associated with the active capability stack and capability requirements for capability based training needed for the candidate AI agent, and acquiring a validated AI agent by running the active capability stack for training of candidate AI agent on the set of capabilities.

An embodiment method includes selecting an artificial intelligence (AI) agent from an AI agent pool as a candidate AI agent according to performance of the AI agent after previous training and further according to capability requirements for capability-based training, and providing the capability-based training for the candidate AI agent. Providing the capability-based training includes acquiring first training data, generating a trained artificial intelligence (AI) agent by training the candidate AI agent to have at least one capability associated with using the first training data, generating synthetic validation data different from the synthetic training data, validating the trained AI agent by performing validation testing on the trained AI agent using first validation data that includes the synthetic validation data, and providing the trained AI agent as a validated AI agent after the validating the AI agent.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1A:
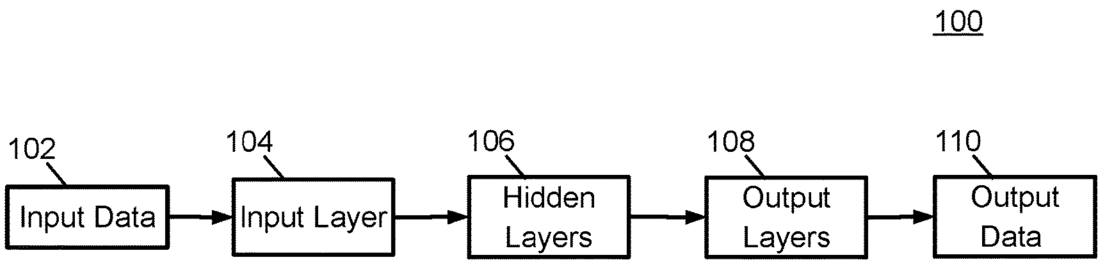
FIGS. 1A-1B are symbolic diagrams illustrating architectures and training systems for AI agents according to some embodiments.

Representative embodiments of systems and methods of the present disclosure are described below. In the interest of clarity, features of an actual implementation may not be described in this specification. It will of course be appreciated that in the development of any such actual embodiment, numerous implementation-specific decisions may be made to achieve the developer's specific goals, such as compliance with system-related and business-related constraints, which will vary from one implementation to another. Moreover, it should be appreciated that such a development effort might be complex and time-consuming but would nevertheless be a routine undertaking for those of ordinary skill in the art having the benefit of this disclosure.

The increasing use of automated systems for vehicle, and for aircraft, drones, self-driving automobiles, and the like has increasingly relied on artificial intelligence (AI) for vehicle features such as vehicle movement automation, object avoidance, pilot assistance, flight stability, or other automated intelligent processes. AI systems may be tasked with handling processes such as automated landings or landing approaches, object recognition for object avoidance, navigation, object identification or classification for threat detection, friendly vehicle identification, or the like. However, in order for mission critical systems, the safety of the AI systems providing data relied on for those mission critical systems must be verified. Training AI agents or models frequently results in a black box system where the results of the AI decision making are generally recognized as being consistent. However, for edge, cases, or unforeseen circumstances, regulatory bodies may be unable to predict how an AI will react, resulting in the uncertainty regarding the overall safety of an AI-based system.

The principles presented herein relate to an automated environment for training and certifying AI/ML agents. This automated training and certification environment is modular and templatized, permitting components can be quickly recycled for use in novel AI applications for different capability requirements. In some embodiments, the system may include software development and testing phases that include controlled development and testing of software that uses AI agents, and for the AI agents themselves. The system may also include capability specific AI training, validation and system testing phases. Automating the process for training the AI agents permits development of basic AI agents that may be used as templates for capability specific training. Additionally, the system provides for customized training that iteratively evaluates the training process, and generates training data customized for the desired capabilities of an AI agent. The data related to the training process, as well as the training data, may be stored for analysis and for validation of the training process and trained AI agents by regulatory authorities. This architecture for the machine or AI teaching environment is intended to meet requirements laid out by the European Union Aviation Safety Agency (EASA) and that are being adopted by the Federal Aviation Administration (FAA).

Thus, the systems and methods described herein may also provide for an automated environment for training and evaluating AI or ML agents using a modular architecture designed for EASA or FAA certification compliance with automated record keeping and tracking of training data for EASA and FAA certification.

Figure 1B:
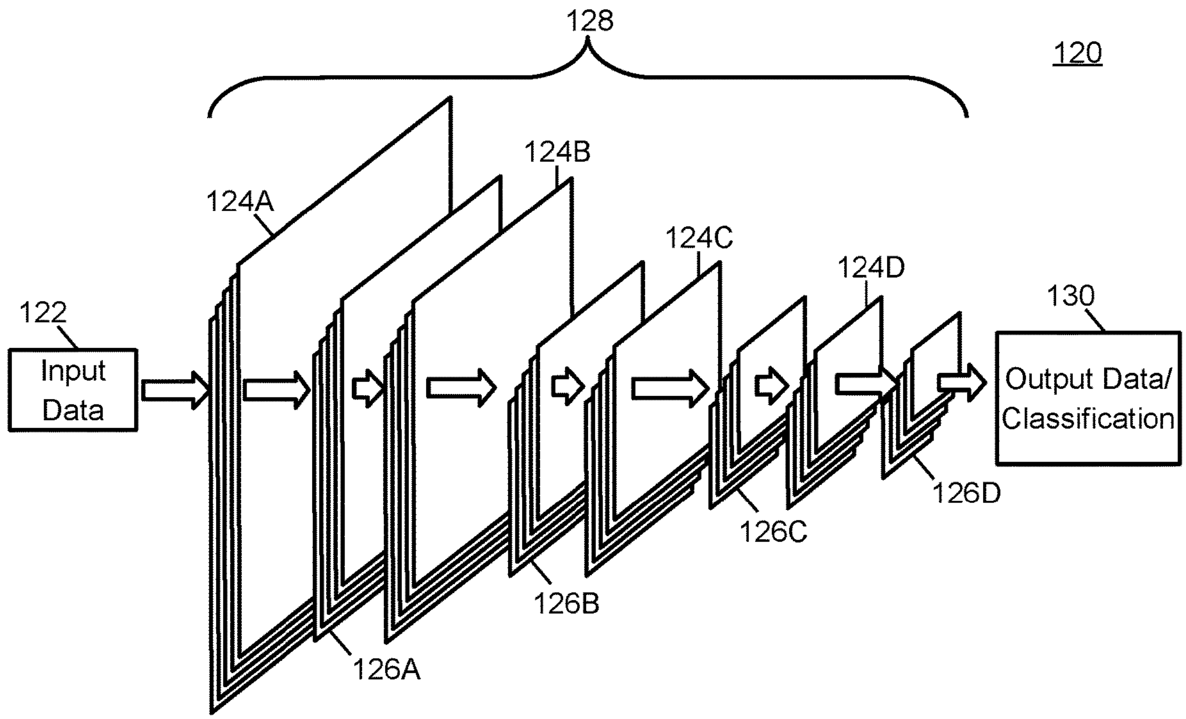

FIGS. 1A-1B are symbolic diagrams illustrating architectures and training systems for AI models according to some embodiments. AI models are a set of mathematical functions that can be used to correlate incoming data with known elements, such as images, sounds, motions, flight paths, motion control or navigation data, voice samples, text data, and the like. Thus, an AI model may be a set of functions used for image, sound, text or motion recognition, for motion control, flight automation, voice recognition or voice interaction, or other AI processes. A commonly used AI model is a convolutional neural network (CNN). AI agents may be software or other implementations of an AI model, and may be implemented as a language acceptor that acts as a finite automaton that generates a “yes” or “no” output or a given input, and with the accepted language being an input that results in a ‘yes’ output.

FIG. 1A is a symbolic diagram illustrating layers of an AI model 100 according to some embodiments. An AI model 100 take in input data 102 though an input layer 104. The input layer 104 converts input data 102 into a format usable by hidden layers 106. For example, in an image recognition or computer vision AI model, the input data 102 may be, for example, an image with two dimensions. In other examples, for an autonomous landing agent, the input data may be fractal curves, for a vehicle health automation agent, the input data 102 may be operational data associated with various operational states, for a pilot voice assistant agent, the input data 102 may be audio data. In some embodiments, the input layer 104 may convert the input data 102 into a numeric representation such as a matrix with the data values reflected in the matrix. In other embodiments, the input layer 104 may convert multidimensional input data 102 into a single dimension array, apply filters, trim or normalize input data 102, or perform other pre-processing functions.

The input layer 104 provides the prepared data to a set of hidden layers 106. In a CNN, the hidden layers 106 provide one or more convolutions or filters. The hidden layers 106 may use filters that are trained by applying weights and biases to a variety of filters to identify desired features from the input data. In some embodiments, the hidden layers 106 may provide probabilities or other data related to extracted or identified features. A CNN may take advantage of hierarchical patterns in input data and assemble patterns of increasing complexity using smaller and simpler patterns in the filters of convolutional layers. Thus, CNNs utilize the hierarchical structure of the data they are processing. CNNs break input data down into smaller, simpler features, which are represented by the filters of the convolutional layers. These filters are applied to different regions of the input to extract the relevant information. As the network progresses through the layers, these features are combined and assembled into more complex patterns, allowing the network to learn increasingly abstract representations of the input.

An output layer 108 may be used to classify data received from the hidden layers 106. The output layer 108 uses the output from the hidden layers 106 to determine a probability that a particular input belongs to a particular classification.

FIG. 1B is a symbolic diagram illustrating layers of an CNN AI model 120 according to some embodiments. A CNN AI model 120 may have hidden layers 128 that receive input data 122 and that perform mathematical processes on the input data 122 so that the input data 122 may be classified. The hidden layers 128 may include one or more convolutional layers 124A-124D, and one or more pooling layers 126A-126D. In some embodiments, each convolutional layer 124A-124D comprises one or more trainable filters or kernels that are applied to the data. Each convolutional layer 124A-124D convolves the input by a filter and passes the result to a next layer. The convolutional layers 124A-124D abstract input data to a feature map, or an activation map.

Pooling layers 126A-126D may be used after convolutional layers 124A-124D to reduce the dimensions of a feature map or other data by combining the outputs of neuron clusters at a layer into a single layer of a following layer. Thus, a pooling layer 126A-126D may combine small clusters of data to reduce the size of data before providing the reduced feature map to a next convolution layer 124A-124D. In some embodiments, pooling may be max pooling, where the maximum value in a local cluster may be provided as a neuron value to the next convolutional layer. In other embodiments, pooling may use average pooling by averaging the values of data in a particular cluster, and passing the average value as a neuron value to a next convolutional layer. The output from the hidden layers 128 may then be passed for classification to a classification element 130 such as an output layer, or the like.

Figure 2:
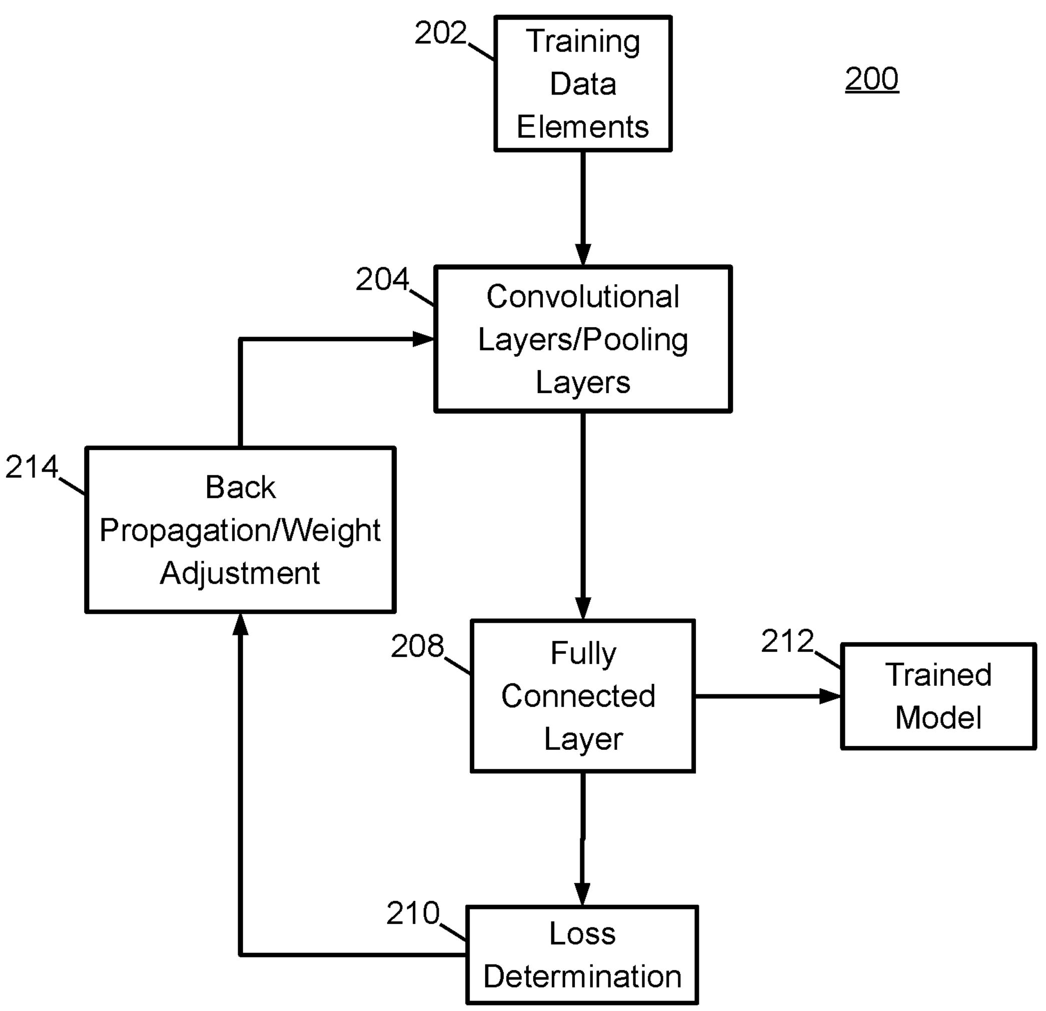
FIG. 2 is a system diagram illustrating a system for training an AI agent according to some embodiments.

FIG. 2 is a system diagram illustrating a system 200 for training an AI agent according to some embodiments. An AI model of an AI agent uses a set of weights and biases used to make predictions, and the error for those predictions is calculated. For example, in image recognition systems, the predictions may be predictions of whether an image is part of an identified class. In other examples, the prediction in a flight control system may be for whether a flight control input is correct, predictions in a digital assistant may be that an audio cue is linked to a particular command or process, the predictions in a vehicle health monitoring system may be a likelihood of a vehicle operational event happening, or another type of prediction associated with the AI agent system.

A training data set having one or more training data elements 202 is identified. The training data set provides data that can be used to train an AI model to identify, or avoid, certain types of data, and relate that data to specified categories of classifications. For example, when training an image recognition AI agent, the training data elements 202 may be static images, videos, or the like, and may have data that can be positively identified as belonging to a desired classification, and data that may be positively identified as not belonging to a desired classification. The desired classification may be a category of conceptual items that the AI agent should identify an analyzed data as belonging to, or not belonging to. For example, in the image recognition system where the desired classification is a dog, the training images may be of dogs and other items, and the AI agent may be trained to identify dog images from the training data set as belonging to the dog classification, and to identify non-dog images from the training data set as not belonging to the dog classification. In embodiments of an engineering process identification AI agent, the training data elements 202 may include positive classification data such as video, images, or other data related to tools, parts, installation or maintenance actions, and the like, and the AI agent may be trained to associate the positive classification data with an engineering process, and one or elements of an engineering process. Additionally, the training data elements 202, or the training data, may also have negative classification data that may include video, images, text, parameter data, flight path data, vehicle operational data or other data that are not associated with the identified engineering process, and in some embodiments, may also include video or images illustrating incorrect features such as process steps, elements, tools, actions, or the like. This permits the AI agent to be trained on what is part of an identified engineering process, what is not part of the engineering process, and what is an incorrect element for the engineering process. For example, an engineering process for vehicle transmission installation may include placing an access panel, inserting bolts in a desired location, and torqueing the bolts to a specified torque in a specified pattern. Training images for training an AI agent to recognize such an engineering process may include positive classification data such as video of a technician placing the access panel in a correct location, and the video may be positively associated with the overall installation process, and with subprocesses or process elements such as access panel installation. The AI may have filters that identify the correct part, the correct location, the correct orientation of the panel, the correct alignment of the panel, or other relevant parameters. The AI may be trained to positively recognize correct training images as belonging to the identified classification. The training images may also include negative classification data such as images, video, or other data that show non-related videos, or incorrect process steps, such as placing the access panel in an incorrect location, in an incorrect orientation, or bolts being torques with an incorrect tool or to an incorrect torque.

In other examples, for an autonomous landing AI agent, the training data elements 202 may include data reflecting flight control inputs, and resulting flight operation classifications, with the AI agent trained to associate flight control inputs with a positive response to a command or external event affecting a vehicle and requiring correction. In yet another example, for a vehicle health monitoring AI agent, the training data elements may include vehicle operational data and associated positive classification related to classifying or identifying vehicle operational states.

The training data elements 202 may be preprocessed by an input layer (not shown) to prepare the training data elements 202 for filtering through one or more hidden layers such as convolution layers and pooling layers 204. The convolution layers 204 may have filters with adjustable weights or biases that affect the weight given to the respective filter when processing data. The training data elements 202 may be processed through the convolution layers and pooling layers 204, and the resulting data is output to one or more fully connected layers 208.

The fully connected layers 208 provide classification for each data element from the training data elements 202. In some embodiments, the fully connected layers 208 generate probabilities that each data element belongs to a particular classification. In some embodiments, a Softmax function is applied to data output from the convolutional layers and pooling layers 204. Softmax is an activation function that scales numbers or unnormalized final scores (logits) into probabilities. In some embodiments, a threshold may be applied to the probabilities or other output generated by the fully connected layers 208 to determine whether the data element affirmatively meets the classification criteria. For example, the system may use a 90% threshold for classification, and a training data element 202 that has a greater than 90% chance of belonging to a particular class is affirmatively classified as being in the class. Alternatively, a training data element that has an 20% change of belonging to a particular class may be classified as being outside the class. In some embodiments, the system may use a lower threshold when classifying training data element 202 as being outside the class, with probabilities falling between the threshold resulting in the training data element being undefined or unknown with respect to the class. Therefore, the system may have a lower threshold of 10%, and a training data element 202 identified as having a 10% chance of being in the class may be identified as affirmatively being outside of the class, while a 25% chance of the training data element 202 being in the class may result in an undefined or unknown classification for the training data element 202.

In some embodiments, fully connected layers are feed forward neural networks. The fully connected layers 208 are densely connected, meaning that every neuron in the output is connected to every input neuron. In a fully connected layer 208, every output neuron is connected to every input neuron through a different weight. This is in contrast to a convolution layer where the neurons are not densely connected but are connected only to neighboring neurons within a width of a convolutional kernel or filter. However, in a convolutional layer, the weights are shared among different neurons, which enables convolutional layers to be used with a large number of neurons.

The input to the fully connected layers 208 is the output from the final convolutional layer or final pooling layer 204, which is flattened and then fed into the fully connected layer 208. During training of an AI agent, outputs from the fully connected layer 208 are passed to a loss determination element 210 that evaluates the results of the AI agent processing and provides data used to adjust weights and biases of the convolutional layers by back propagation or weight adjustment 214.

The loss determination element 210 specifies how training penalizes the deviation between the predicted output of the network, and the true or correct data classification. Various loss functions can be used, depending on the specific task. In some embodiments, the loss determination element 210 applies a loss function that estimates the error of a set of weights in convolution layers of a neural network. For example, errors in an output may be measured using cross-entropy. For example, in some training systems, the likelihood of any particular data element belonging to a particular class is 1 or 0, as the class of the data elements is known. Cross entropy is the difference between an AI agent predicted probability distribution given the dataset and the distribution of probabilities in the training dataset. The loss layer may use a cross entropy analysis to determine loss for a training data element 202 or set of training data elements 202.

Back propagation allows application of the total loss determined by the loss determination element 210 back into the neural network to indicate how much of the loss every node is responsible for, and subsequent updating of the weights in a way that minimizes the loss by giving the nodes with higher error rates lower weights, and vice versa. For example, in some embodiments, a loss gradient may be calculated, and used, via back propagation 214, for adjustment of the weights and biases in the convolution layers. A gradient descent algorithm may be used to change the weights so that the next evaluation of a training data element 202 reduces the error identified by the loss determination element 210, and where the optimization algorithm navigates down the gradient (or slope) of error. Once the training data element 202 are exhausted, or the loss of the model falls below a particular threshold, the AI agent may be saved, and used as a trained model 212.

Figure 3:
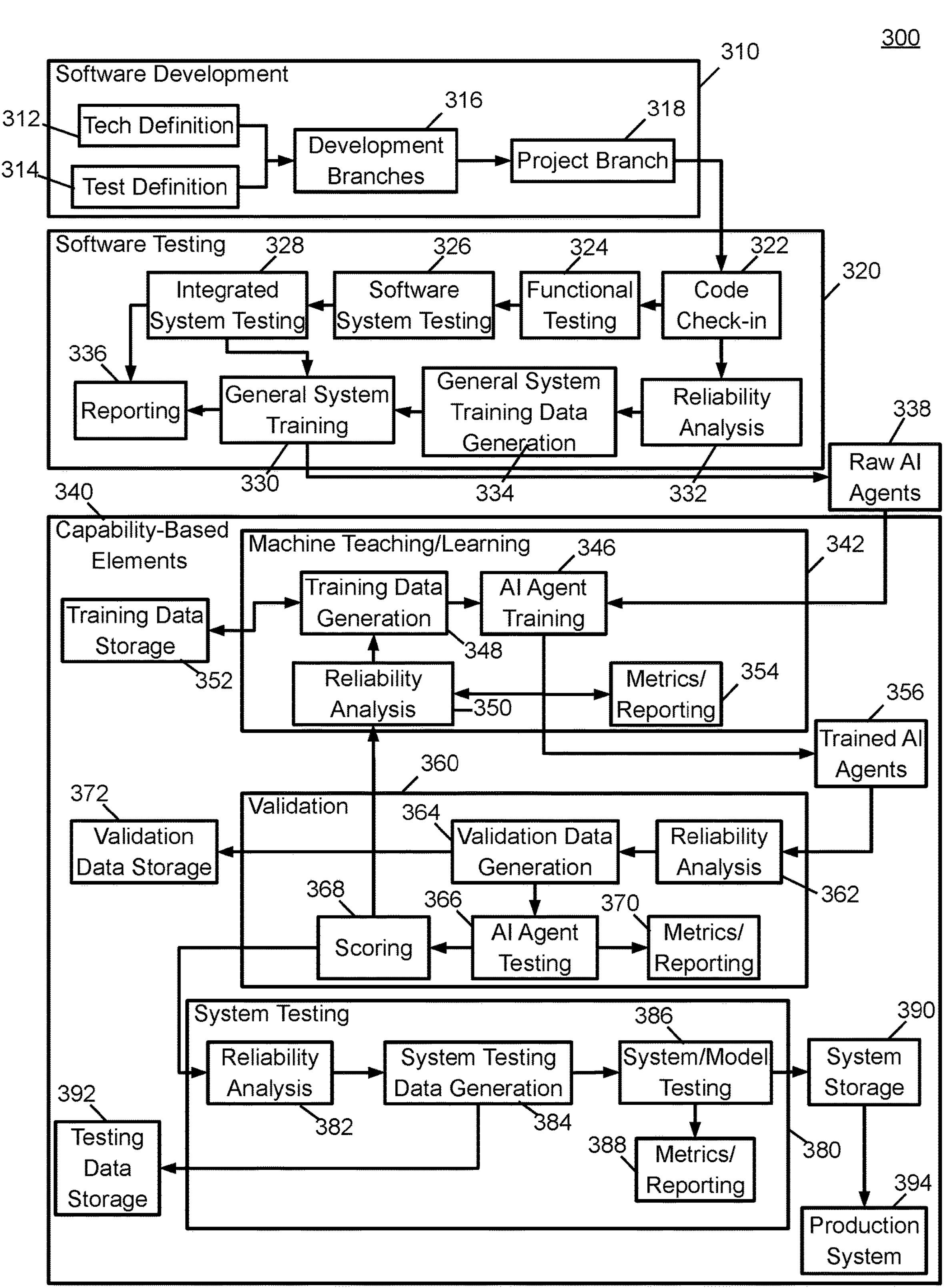
FIG. 3 is a logical diagram illustrating a system for automated AI teaching according to some embodiments.

FIG. 3 is a logical diagram illustrating a system 300 for automated AI teaching and learning according to some embodiments. The system 300 may, in some embodiments, be a machine or AI teaching and learning environment that provides for development of AI agents and related software, and for providing automated training, evaluation and testing of AI agents and related software. In some embodiments, the system 300 provides for AI agent development and may include a software development element 310, software testing element 320, and capability-based element set 340 including a machine teaching or learning element 342, a validation element 360, and a system testing element 380.

The system 300 may be implemented on one or more computer systems, for example, using standalone computers, one or more servers, and/or cloud computing resources or systems. Thus, the system may have one or more processors and one or more non-transitory computer readable media, which may store computer code for implementing functionality of the system. In some embodiments, movement of software, code, compiled elements, and other assets through the system 300 machine teaching environment may be orchestrated by, for example, a collaboration system such as Azure DevOps.

The system 300, whether an integrated or independent monitoring system, may include one or more processors and one or more computer readable medium storing computer code thereon. References to computer-readable storage medium, computer program product, tangibly embodied computer program, or the like, or a controller, monitor, engine monitor, monitoring system, computer, processor, or the like should be understood to encompass not only computers having different architectures such as single or multi-processor architectures and sequential (Von Neumann) or parallel architectures but also specialized circuits such as field-programmable gate arrays (FPGAs), application specific circuits (ASICs), signal processing devices and other devices. References to computer program, instructions, code, or the like, should be understood to encompass software for a programmable processor or firmware such as, for example, the programmable content of a hardware device whether instructions for a processor, or configuration settings for a fixed-function device, gate array or programmable logic device, or the like.

The system 300 may have at least one processor and at least one memory, such as a non-transitory computer readable medium, and may include computer program code, that is configured to, with the at least one processor, provide the AI teaching and learning features. The memory may be a single component or it may be implemented as one or more separate components some or all of which may be integrated or removable and may provide permanent, semi-permanent, dynamic, or cached storage.

The one or more processors are configured to read from and write to the at least one memory. The processor may also comprise an output interface via which data or commands are output by the processor and an input interface via which data or commands are input to the processor. The memory stores a computer program including computer program instructions that control the operation, when loaded into the processor, of the overall system 300, or one or more of the software development element 310, software testing element 320, a machine teaching or learning element 342, validation element 360, or system testing element 380. The computer program instructions provide the logic and routines that enable the apparatus to perform the AI teaching and learning processes and methods and implement the AI teaching and learning systems. The processor, by reading the memory, is able to load and execute the computer program. The computer program or programs may arrive at the apparatus via any suitable delivery mechanism. The delivery mechanism may be, for example, a computer-readable storage medium, a computer program product, a memory device, a record medium such as a compact disc read on only memory (CD-ROM), digital versatile disc (DVD), portable memory such as a memory stick or hard drive, or the like, an article of manufacture that tangibly embodies the computer program. In some embodiments, the delivery mechanism may be a signal configured to reliably transfer the computer program over the air or via an electrical connection.

In some embodiments, the software development element 310 may include one or more technical definitions 312 and test definitions 314. The technical definition 312 may be a set of specifications, goals, thresholds, or designs, to which a software project is developed. The technical definitions 312 may define the proposed capabilities for a system that uses AI, and may, in some embodiment, define desired capabilities for an AI agent to be used with a system under development. For example, for a system being designed to handle formation flight between drones in a group, the technical definitions may include hardware and other facilities on which the formation flight system will be run, capabilities or flight characteristics of the proposed avionics platforms, desired functions to be performed by the formation flight system, requirements for precision during flight, relevant regulations, or other features that are taken into account when developing the formation flight system. Additionally, in the formation flight system example, the technical definition may also include parameters for an AI that may be used in the formation flight system, such as requiring object recognition of other drones in the formation, the ability to perform depth or distance estimation and to recognize the orientation of other drones, the ability to recognize flight obstacle such as trees, building, other non-formation aircraft, the ground, and the like. Additionally, the test definitions 314 may define requirements or parameters which a developed system must meet, or that may be used as part of the AI training process. For example, the test definition 314 may require that a formation flight system control a particular drone with a 3 inch positional accuracy, and may define the parameters for testing that requirement, such as testing in particular wind or gustiness conditions, with a particular payload or with a particular battery charge, response to loss of communications with any control systems, response to component failures, and the like. The test definitions 314 may also include requirements for an AI agent. For example, for a depth estimation accuracy requirement, the test definitions may include definitions on how depth estimation accuracy will be verified, such as testing that the system correctly recognizes drones of the flight formation, and accurately estimates the distance to the drones, at various attitudes, with various backgrounds, in various lighting conditions, at various distances, and the like.

The software development element 310 may include one or more development branches 316 which may each be code sets on, or developed using, development environments, development systems, software repositories, or the like. The development branches 316 may be code, or environments for AI agent development, and may include assets such as projects, modules, files, libraries, subsystems, or other assets, or development environments for developing AI agents or code for AI agents by coders for integration into a project branch 318. For example, the development branches 316 may be software developed on terminals, and code or software of the development branches may be managed though a code management system, version control system, code repository system, or the like. The software submitted through the development branches 316 may be part of a larger code base or project, and may be aggregated into project branch 318. The project branch 318 may be a set of assets that is stored or aggregated on a storage system for integration of the different development branches 316. Thus, the software development element 310 may be implemented on a computing system, and may have software for managing, storing, and tracking technical definitions 312, test definitions 314, development branches 316 and project branches 318.

In a software testing element 320, code developed for the software development element 310 may be tested and processed. In some embodiments, the software testing element 320 may be at least partially automated and may run on testing systems such, for example, one or more servers, cloud computing platforms, standalone computer systems, or the like, or a combination of any type of testing system. Testing of the systems may include verifying that the software responds to inputs in a predictable and desirable manner, and that edge case inputs, situations or data produce acceptable results. Processing of the software systems may include general training of any AI agents used in the software system to generate raw AI agents 338.

In some embodiments, the software testing element 320 include a code check-in element 322 or system. The code check-in element 322 may be a version control system, code repository, software management system, or the like. In some embodiments, the code check-in element 322 may, for example, perform submission checks, such as compiling newly submitted code with previously submitted code to ensure that the newly submitted code compiles correctly and meets code requirements, or the like. The code check-in element 322 may be used to aggregate and integrate code from one or more different project branches 318 and multiple development branches 316, and may provide a compiled or testable software system.

The software testing element 320 may have an automated software testing branch for ensuring code and function quality that includes a functional testing element 324 that performs testing on each function or section of code, a software system testing element 326 that performs testing on the overall software system or performs testing at the module or project level. The software testing element 320 may also have an integrated system testing element 328 that performs testing of the software in a related hardware or simulated hardware environment.

The testable software system from the code check-in element 322 may be provided to the functional testing element 324, which may test overall code performance, or may test sections of code identified, for example, in a test definition 314, by providing inputs to functions, modules, process, user interface inputs, application program interface (API) inputs, or the like. Testing using the provided inputs may include verifying that the results or outputs generated by tested software sections meets the technical definitions 312 and test definitions 314. In some embodiments, the inputs may be randomized within ranges specified for the tested software, and may be automatically generated so that the testing may be automated according to the technical definitions 312 and the test definitions 314.

In some embodiments, the software system testing element 326 may include testing of the performance of the software with respect to hardware and overall system reliability. For example, in some embodiments, the software system testing element 326 may test parameters such as the processor or central processing unit (CPU) use or heat generated by the software under varying load conditions.

Additionally, the software system testing element 326 may test the mean time between failures (MTBF) for the software, and may run the software with randomized or predetermined inputs to determine failure modes or failure likelihood of the software.

In some embodiments, the integrated systems testing element 328 may provide testing of the software in an exemplary hardware embodiment, and in some embodiments, the testing may be automated using the test definitions 314 or other predetermined testing parameters, including, but not limited to randomized inputs, predetermined inputs, various environmental conditions, load conditions, operating conditions, or failure conditions, or the like. For example, for drone control software for f, for example, formation flight, the software may be deployed on a working drone, and the software interaction with other avionics systems, applications, control systems, hardware, and the like may be tested.

The software testing element 320 may further have an automated general training branch that includes a reliability analysis element 332, and general training data generation element 334 and a general system training element 330. Once the software passes each testing element, the software may be moved to the automated general training branch, or if the software fails one or more testing elements, the software may be returned to the software development element 310 for additional development and refinement, or be completely discarded.

The automated general training branch may provide general training for an AI agent to generate a raw AI agent 338 that is appropriate for more specific training. In some embodiments, the general training for the AI agent may be related to training an AI to interact with particular hardware system, such as drones or avionics systems, or training an AI agent to recognize basic objects for future object recognition tasks, to differentiate between airborne objects and stationary or ground-based objects, or the like.

In order to optimize the training for the AI agent, the code may be provided to a reliability analysis element 332. The reliability analysis element 332 may be a system that analyzes robustness, reliability, sensitivity, and other stability, dependability or reliability characteristics. For example, the reliability analysis element 332 may use automated analysis software such as OptiSlang®, a computer aided design (CAD) system, a software model or architecture analysis system, or another systems analysis system, to perform the reliability analysis. The reliability analysis element 332 may provide metrics on what features for the software should be emphasized during training, or for other optimization objectives or parameters.

The general training data generation element 334 may generate data for use in the general system training element 330 using a training data generation system. The general training data generation element 334 may generate synthetic training data using, for example, CAD models for particular physical projects, and may provide photorealistic images with appropriate backgrounds for use in training. In other examples, the synthetic training data may be fractal curves or other flight data, vehicle operational data, audio data, text, or other generated data. In some embodiments, the training data generation system may have a training data model management system, such as a vehicle simulator and a graphics element, such as a graphics engine. The training data model management system may be a flight simulator, such as Airsim™, or the like, which may provide graphic model data to the graphics engine, such as a Unity® engine, Unreal® engine, or another graphics engine, graphics generation program, digital modelling program, or the like. The training data generation system may provide image or video data to the general system training element 330. For example, a flight simulator system may use a graphics engine, with the flight simulator system providing data on landscape, buildings, or realistic aircraft, to the graphics engine, which generates photorealistic synthetic data for training the AI agent. Thus, the general training data generation element 334 may generate synthetic photorealistic image or video data with any desired subject structures, environment, camera features, and the like.

The general system training element 330 may provide an environment for training an AI agent of a software system. For example, the general system training element 330 may provide a runtime environment where data is sent to the AI agent for processing, and the response or output from the AI agent may then be evaluated and the AI agent parameters adjusted in an iterative fashion. The general system training data generation element 334 may provide data for each of the training iterations. In some embodiments, the general system training data generation element 334 may provide synthetic data generated by, or under the control of, the general system training data generation element 334, or may provide real or previously generated data, or a combination of both generated data and real data for training. Additionally, the general system training data generation element 334 may generate data according to the output of an iteration of the general system training element 330. For example, for a drone formation flight AI agent, the training may be associated with training an AI agent to differentiate between flying objects and ground based objects. The general system training data generation element 334 may provide images of different ground based objects and different flying objects for use in training the AI agent, and may generate the ground based objects or flying objects while the AI agent correctly differentiates between the objects with a success rate below an identified threshold. Thus, the AI agent training may continue with data generated by the general system training data generation element 334 until the AI agent reaches an acceptable accuracy in performing the training objective. Additionally, the general system training element 330 may provide feedback to the general system training data generation element 334, indicating what types of data are needed for training so that the general system training element 330 can provide additional training for aspects of the AI agent training that need to be emphasized for additional or corrective training. Additionally, the general system training data generation element 334 may also generate a second type of training data related to, for example, automating the flight of the vehicle under control of the AI agent. The second type of training data may be associated with the other training data, so that, for example, flight commands may be associated with particular images, objects, or the like.

After the general system training element 330 trains an AI agent, the AI agent may be saved or stored as a raw AI agent 338 for later use in more specific training. The software testing element 320 may also have a reporting element 336 that generate reports, metrics, or the like, for an AI agent trained by the general system training element 330, or for the training process, training data, or other elements related to training of the AI agent. In some embodiments, each raw AI agent 338 may have an associated report that describes operational parameters of the respective raw AI agent 338.

The capability-based element set 340 provides elements for specific training of a raw AI agent 338 and defines the core machine learning or teaching, AI teaching or AI training activities. In some embodiments, the capability-based element set 340 includes a machine teaching or learning element 342 that performs capability-specific training on a candidate AI agent.

A candidate AI agent is selected based on specific training objectives, and is used in the machine teaching or learning element 342. The candidate AI agent may be selected from the raw AI agents 338, or may be an already trained AI agent that will be retrained for the capability specific training by the capability-based element set 340. The selection of the candidate AI may be made according to a report on the candidate AI agent and, for example, one or more capability requirements. In some embodiments, the system 300 may have an AI selection element that correlates performance of a raw AI agent after general system training, using, for example, reports for an AI agent and capability requirements, and that selects one or more candidate AI agents accordingly. For example, the AI selection element may select the 5 raw AI agents and previously trained AI agents that have, according to the report, the capabilities closest to the capability requirements, and may automatically train the candidate AI agents, or provide a description of the candidate AI agents to a user for selection of AI agents for capability-specific training. In some embodiments, an already trained AI agent may be retrained, using, for example, transfer learning, with new data based on the performance of the AI agent with the original training, and depending on degradation in performance. An AI agent may be selected for training based on the accuracy of the AI agents' previous training, and whether the accuracy meets a predetermined accuracy threshold. For example, an AI agent trained for autonomous flight may be retrained for formation flight if the original training or operation was more than 90% accurate, as the objective is to reach 100% accuracy/precision prior to taking into account the sim-to-real gap.

In some embodiments, if retraining degrades performance, the AI agent may be abandoned. The system may take advantage of the many training runs an AI agent undergoes, and may determine, based on performance variation, whether retraining would be more efficient, requiring fewer training cycles than training a raw AI agent 338. Thus, retraining a trained AI agent 356 for new capabilities may permit the retraining to start with predefined or preset weights and biases rather than using random weights and biases used when training a new or untrained AI agent, or when training a raw AI agent 338.

In some embodiments, a training data generation element 348 provides training data to an AI agent training element 346. The training data may be synthetic data or real data, or a combination of both. The real data may be stored in training data storage 352 and retrieved when needed, and generated synthetic data may be stored in the training data storage 352 after generation for later analysis. The real data may include data from actual, live or previously live data collection. For example, real data for image recognition training may include photographs or videos of real aircraft or missiles, real trees, real aircraft, real overhead lines, or the like.

The training data generation element 348 may be a system, server, cloud service, application or set of applications, or other executable code running on a cloud platform, or other computing platform, or the like, that dynamically generates synthetic training data. The ability to dynamically generate synthetic data is utilized at every phase of the system pipeline to enable thorough training, testing and validation of the AI or ML agent.

In some embodiments, the training data generation element 348 and may use a flight simulator such as AirSim™ or other digital structure management system to provide data on structures to be rendered by a graphics engine, such as the Unity® engine, Unreal® engine, or another graphics engine, graphics generation program, digital modelling program, or the like. Additionally, in some embodiments, the training data generation element 348 will use the same training data generation system as the general system training data generation element 334, and in some embodiments, may use the same instance of the training data generation system, or may use different instances of the training data generation system.

The training data generation element 348 provides the training data to an AI agent training element 346 that trains the selected candidate AI agents. The AI agent training element provides an environment where candidate AI agents are trained by running the AI agents with the training data from the training data generation element 348, so that the training data is processed by the candidate AI agent, the outputs of the AI agent are evaluated for correctness, and the AI agent is adjusted or configured based on the output of the processing of one or more pieces of training data. The AI agent training element 346 receives, loads, or otherwise acquires one or more candidate AI agents from, for example, an AI agent pool where, one or more of the AI agents may be raw AI agents, 338, and one or more of which may be previously trained AI agents 356.

The training data generation element 348 may acquire training data by generating synthetic data and retrieve real data from the training data storage 352, and may provide the training data to the AI agent training element 346 for training of the selected AI agents. Use of the synthetic data ensures that data from combinations of parameters may be used for training, and allows identification of failure points and training on data where an AI agent training is weak, or does meet a desired accuracy.

In some embodiments, the AI agent training element 346 may load multiple candidate AI agents, and kick off separate pipes, each for training a different candidate AI agent. In some embodiments, different AI agents may be trained at the same time with different, or the same, starting training data, and in other embodiments, the same candidate AI agent may be trained in different pipes with different starting training data, or using different training techniques. In other embodiments, AI agents with the same technical definitions 312 may be developed using different development methodologies or architectures, and the differently developed AI agents may be trained with the same initial training data to ensure the most accurate AI agent is produced. Additionally, in some embodiments, as the different AI agents in different pipes are trained, the AI agents may be optimized differently, and may respond to training in different ways, and so different AI agent instances in different pipelines may receive different training data during at least part of their training. Each trained AI agent will need to meet specific performance requirements defined with respect to each desired capability, and multiple potential agent architectures will be simultaneously trained for a single desired capability. One or more final selected agents may be identified upon their relative performance and the individual or collective coverage of the input data space that defines the desired capability.

In some embodiments, the machine teaching or learning element 342 further has a reliability analysis element 350 that evaluates or analyzes robustness, reliability, sensitivity, and other stability, dependability or reliability characteristics. In some embodiments, the reliability analysis element 350 may be similar to the reliability analysis element 332 of the software testing element 320. For example, the reliability analysis element 350 may use automated analysis software such as OptiSlang®, a computer aided design (CAD) system, a software model or architecture analysis system, or another systems analysis system, to perform the reliability analysis. In some embodiments, the reliability analysis element 350 of the machine teaching or learning element 342 uses the same software for reliability analysis as the reliability analysis element 332 of the software testing element 320, but the reliability analysis element 350 may use different parameters for analysis of the training of the candidate AI agent by the AI agent training element 346. The reliability analysis element 350 may provide metrics on what features for the software should be emphasized during training, or for other optimization objectives or parameters. Thus, OptiSlang and AirSim to may be used to dynamically generate an infinite supply of training data.

In some embodiments, the reliability analysis may be performed after a preset number of training iterations, or may be performed after every training iteration. For example, a reliability analysis may be performed after the first 5,000 data elements are processed by the AI agent training element, and the results of the reliability analysis may be used to adjust the training data generated by, or provided by, the training data generation element 348. The reliability analysis may be used to quantify contribution with respect to the defined variable ranges of optimization variables for possible improvement of the AI agent responses. For example, on an image recognition system, the reliability analysis may determine that the lighting brightness of training images is a significant contributor to the AI being trained to correctly identify images, and may indicate to the training data generation element 348 to provide images with a particular distribution of brightnesses, or that image brightness is a variable that needs to be emphasized.

The training data may be received from the training data generation element 348, which selects the training data according to feedback from the AI agent training element 346, and from the reliability analysis element 350. For example, the training data generation element 348 may select training data based on the candidate AI agent being trained, and may adjust the training data based on the effectiveness of the AI agent training reported by the AI agent training element 346, and by the results of the reliability analysis. For example, where the AI agent is being trained for formation flight, and the AI agent training element reports that the AI agent has achieved a desired threshold of correct identification of flying drones when using purely synthetic data, the AI agent training element 346 may report that, for example, the change in the results of AI agent training has plateaued, or stopped increasing, and the training data generation element 348 may interleave synthetic and real data. Additionally, in some embodiments, the training data generation element 348 may introduce other variables or system operational anomalies that provide a variety of data environments. For example, for an image recognition system the training data generation element may vary training data using variables such as changing color, lighting, camera angles, backgrounds, speeds of objects, or the like, may be introduced. Additionally, the training data generation element 348 may introduce system operational anomalies such as introducing camera jitter, missing video frames, adding video or image noise, providing out-of-focus training data, or the like.

In some embodiments, the reliability analysis element 350 may also provide data on variables that might optimize or improve system performance, and the training data generation element 348 may weight the training data provided to the AI agent training element 346 to reflect the reliability analysis data. For example, in an object recognition system, where a sensitivity, robustness or reliability evaluation of the reliability analysis element 350 indicates that a camera angle of the object being recognized highly influences the accuracy of the AI agent image recognition, the reliability analysis element 350 may indicate that to the training data generation element 348, which may increase the variance of camera angles, or extend the training of the AI agent to provide more training on recognizing objects at different anglers.

The AI agent training by the AI agent training element 346 continues until the AI agent meets one or more thresholds, that may, in some embodiments, be defined by the test definition 314, or until the AI agent meets another threshold. For example, the AI training may continue until the AI agent achieves a 99% accuracy for all training categories or variables or until the accuracy for all training categories or variables stops increasing. The AI agent may be considered to have passed the training when the accuracy for one or more training categories or variables meets a threshold, and may be considered to have failed if one or more training categories or variables does not meet an accuracy threshold. AI agents that pass the AI training may be saved as trained AI agents 356. Additionally, one or more reports or metrics may be generated on the AI agents after the AI agent completes training. The report or metrics may include a reason for failing the training, or may include a report of the training accuracy of the AI agent, analysis of the reliability of the AI agent, or any other analysis of the AI agent.

In a validation element 360, a trained AI agent 356 is tested to determine whether the trained AI agent 356 operates as expected outside of training. The trained AI agent 356 may operate differently than in training due to biases in training, presumptions used in training, misunderstanding or incorrect interpretation of the goals of training, or other incorrect operating parameters. Validating the trained AI agent 356 ensures that the trained AI agent 356 operates as intended in practical operating scenarios. The trained AI agent 356 may be provided to a validation element 360 for testing. In some embodiments the validation element 360 has a validation data generation element 364, an AI agent testing element 366, and a reliability analysis element 362.

In some embodiments, the reliability analysis element 362 evaluates or analyzes robustness, reliability, sensitivity, and other stability, dependability or reliability characteristics. In some embodiments, the reliability analysis element 362 may be similar to the reliability analysis element 350 of the machine teaching or learning element 342 or the reliability analysis element 332 of the software testing element 320, using automated analysis software such as OptiSlang, a computer aided design (CAD) system, a software model or architecture analysis system, or another systems analysis system, to perform the reliability analysis.

In some embodiments, the reliability analysis element 362 of the machine teaching or learning element 342 uses the same software for reliability analysis as the reliability analysis element 332 of the software testing element 320, but the reliability analysis element 350 may use different parameters for analysis of the training of the candidate AI agent by the AI agent training element 346. The reliability analysis element 362 may provide data distribution information regarding the data distribution of training parameters so that the validation data generation element 364 uses an even data distribution from the data space.

The validation data generation element 364 generates synthetic data that may be different from the data generated for training the AI agent to ensure that the trained AI agent 356 is trained on the concepts represented by the training data, rather than being trained to recognize the specific training data itself. The validation data generation element 364 may dynamically generate new data to include relevant validation data or scenarios, and may use probabilities describing test parameters to generated types of validation data with an even sampling across a data space according to combination of parameters or requirements under test. In an image recognition AI agent embodiment, the validation data generation element 364 may dynamically generate new data to include relevant scenarios such as particular lighting and weather conditions, and may have a variety of positive and negative recognition object image data in the different lighting and weather conditions. For example, where an image recognition AI agent is used for a formation flight system, the validation data generation element 364 may generate a number of synthetic test images with different scenarios by varying the lighting brightness across both positive and negative recognition objects to determine the accuracy with which the AI agent positively identifies positive identification objects for a particular class, and the accuracy with which the AI agent excludes negative identification objects from a particular class. In another embodiment for an automated landing AI agent embodiment, the validation data generation element 364 may dynamically generate new data to cover varying weather or wind conditions that effect flight characteristics of a vehicle, vehicle control system failures, and the like, and may have a variety of positive and negative data or scenarios to fully validate the trained AI.

Generation of the validation data may further include varying other parameters, and the distribution of the variances of the parameters may be evenly sampled to accurately assess the overall accuracy of the AI agent training. Additionally, in some embodiments, the validation data may also include real or live data that is taken from real or live situations where a system may test the AI agent to ensure that the AI agent correctly recognizes or operates on the real or live data to simulate actual operation of the AI agent.

In some embodiments, the validation data may also be sent to validation data storage 372. The validation data may be stored for future analysis or review to ensure that the testing or validation was thorough, and to improve the validation process for later iterations. Additionally, the validation data may be stored for review by certifying authorities to ensure that a trained AI agent 356 that is presented as complying with regulations was tested to meet the relevant regulations.

In some embodiments, the AI agent testing element 366 is a system, such as a software system or environment for running the AI agent to process the validation data. For evaluation of the AI training, the biases and weights generated during training are used during validation, and the output of the AI agent may be scored, by for example, a scoring element 368. Additionally, one or more metrics or reports may be generated on the validation by a metrics and reporting element 354. In some embodiments, the metrics and reporting element 354 generates data related to the validation so that the validation process may be audited, certified, reviewed, or otherwise analyzed to ensure that the validation of the AI agent training was performed according to relevant rules, regulations, standards, or the like.

In contrast with training, running the AI agent in the AI agent testing element 366 with the validation data uses the trained AI agent 356 without using the feedback from a loss determination element, loss layer, or the like, to adjust the weights and biases of filters in the AI agent. Instead, a fit value or fit model, root mean square error determination of the correctness results, or another calculation or metric may be used to determine a score, or value for correctness or accuracy, false positive, false negatives, or other forms of rating the output. The scoring may generate a rating or other measurement of the performance of the trained AI agent 356. The modality of the data used to train the model can vary based on the desired capability. In some embodiments, the modality will be optical data. In some embodiments, the modality may be thermal data. In other embodiments the modality may be multispectral data.

After the trained AI agent 356 is validated, and the scoring indicates that the training has been validated, the AI agent under testing may be provided to a system testing element 380 for testing of integration of the AI agent with a particular hardware system. Where the AI agent fails validation, for example, where the scoring indicates that the training of the AI agent did not result in the desired accuracy for one or more parameters, the AI agent may be returned to the machine teaching or learning element 342 for additional training, or may be discarded or saved for future analysis.

In some embodiments, the system testing element 380 may include a reliability analysis element 382 similar to the reliability analysis element 332 of the software testing element 320, the reliability analysis element 350 of the machine teaching or learning element 342, or the reliability analysis element 362 of the validation element 360. In some embodiments, the reliability analysis element 382 may use automated analysis software such as OptiSlang or the like, to perform the reliability analysis on the validated AI agent. Similar to the reliability analysis element 362 of the validation element 360, the reliability analysis element 382 may provide, to the system testing data generation element 384, data distribution information regarding the data distribution of training or validation parameters with respect to one or more specific selected hardware arrangements for testing of the validated AI agent. The system testing data generation element 384 may use the data distribution information on the parameters to generate testing data having an even data distribution from the data space covering the combinations of AI agent training parameters. The system testing data generation element 384 may generate synthetic data, for example, using the Airsim system described above, or may use real or live data, or synthetic data in combination with real or live data.

In some embodiments, the system testing element 380 further includes a system and model testing element 386, such as a software system or environment for testing the AI agent using the testing data in a target hardware environment that is, or closely simulates, realistic hardware identified as a host system for the AI agent. For evaluation of the AI training and validation, the validated AI, with the biases and weights generated during training and tested during validation, are used during system testing. The output of the AI agent when using, or connected to, a designated hardware system may be tested to determine whether the AI agent is able to achieve the desired parameters, such as correctness thresholds for various training parameters, while integrated into the hardware system. Additionally, one or more metrics or reports may be generated on the system testing by a metrics and reporting element 388. In some embodiments, the metrics and reporting element 388 generates data related to the system testing so that the system testing process may be audited, certified, reviewed, or otherwise analyzed, and to provide information on the system testing for determination of whether the final system is usable for its intended purpose.

In some embodiments, an exemplary hardware host system may be used as part of the system and model testing element 386. A hardware testing system of the system and model testing element 386 may connect to the exemplary hardware host system to, for example, provide the system testing data. For example, for a flight formation AI agent used on a drone, the AI agent may be loaded into a memory of the drone for execution by the drone processor. While the drone may have a camera, the testing system may include a separate computer system that generates system testing data that is provided to the drone processor as if it were coming from the camera itself. For example, cabling may be provided to connect between the drone processor and the camera system, or in place of cabling from the camera, so that the system testing data is provided over the same communications link through which the camera would normally provide image data. In another example, sensor data for testing a flight automation AI system may be provided over a product communications system. In other embodiments, the system testing data generation element 384 may be loaded onto the drone itself, and may run on the drone processor, or another processor on the drone, to provide system testing data to the AI agent.

In some embodiments, the system testing data may also be sent to testing data storage 392. The system testing data may be stored for future analysis or review to ensure that the system testing was thorough, and to improve the system testing process for later iterations. Additionally, the system testing data may be stored for review by certifying authorities to ensure that hardware with a validated AI agent was tested to meet the relevant regulations.

During the system testing, the responses from the AI agent running on the system specific hardware may be evaluated to determine whether performance of the AI agent, when running on the system specific hardware, meets one or more system requirements, such as performance thresholds. This may include performance of the specified capabilities, accuracy, speed, failure handling, resource usage, and the like. If evaluation of the system testing results indicates that the AI agent meets the system testing requirements, the validated AI agent may be stored in system storage 390. System storage may be a separate storage system, such as on a server, a cloud platform, in a database, or other electronic storage system, that permits the validated AI agent to be reproduced for use on production systems. The validated AI agent may then be loaded into a production system 394, such as a hardware device, drone, avionics system vehicle, computer or other execution environment for general use, further testing, or the like.

Figure 4:
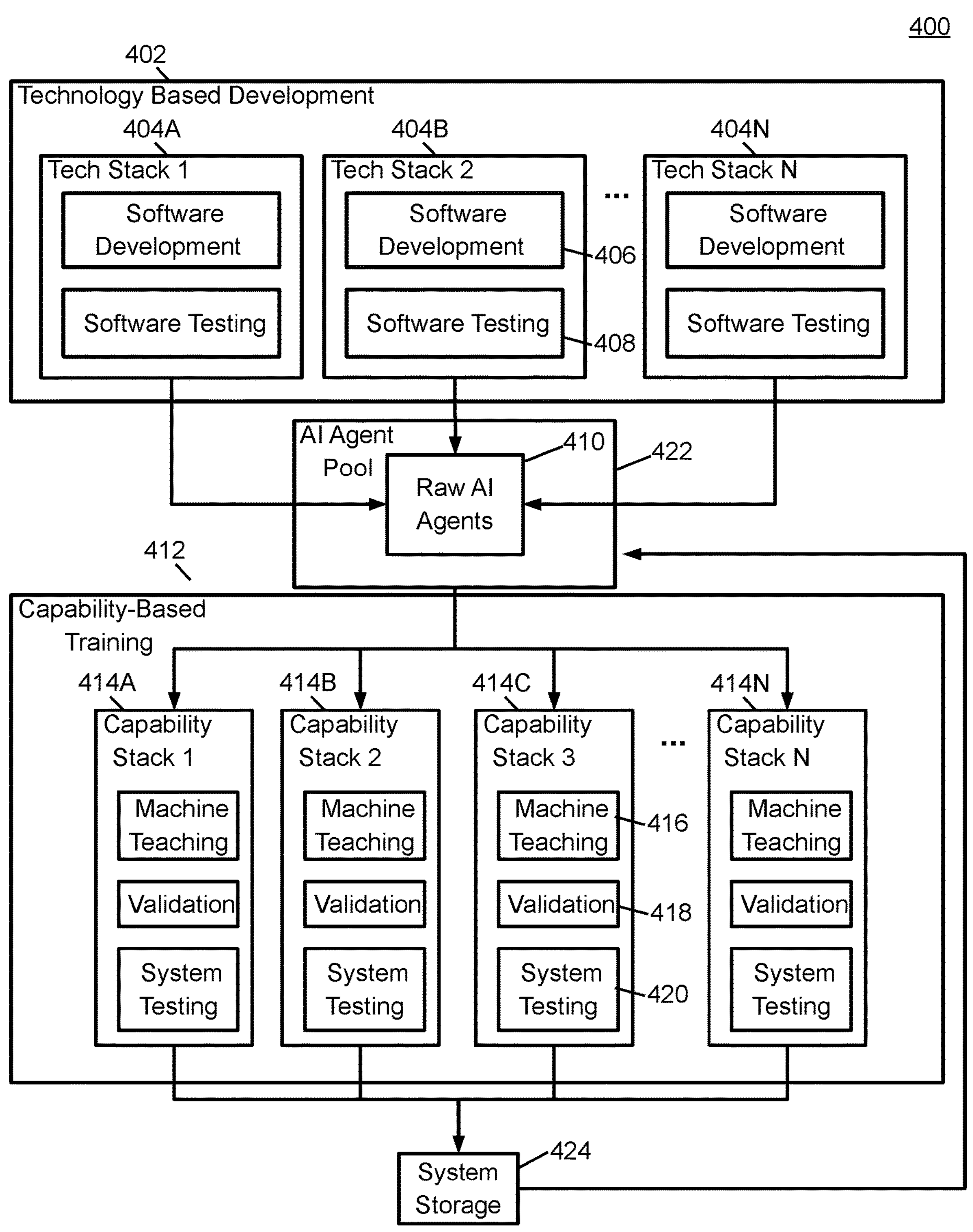
FIG. 4 is a logical diagram illustrating a system for providing a modular automated AI arrangement according to some embodiments.

FIG. 4 is a logical diagram illustrating a system 400 for providing a modular automated AI teaching and learning arrangement according to some embodiments. A modular AI teaching and learning system may permit development of AI agents using different tech stacks 404A . . . 404N. For example, technology based development 402 using different tech stacks 404A . . . 404N may be separate from capability-based training element 412 intended to train raw AI agents 410 to have different capabilities using different capability stacks 414A . . . 414N. Thus, the development and training of AI agents may be separated so that training of the AI agents is not dependent on the development of a particular AI agent. Each tech stack 404A . . . 404N may have a separate software development element 406 and software testing element 408 that is optimized or specific to the tech stack 404A . . . 404N.

This permits raw AI agents developed under different tech stacks 404A . . . 404N to be pooled together in the AI agent pool 422, creating a larger group of AI agents, with greater capability variety, from which AI agents can be selected as candidate AI agents for capability specific training. Additionally, separating the development from the capability-based training permits trained AI agents to be included in the AI agent pool and used for training with new capabilities, further increasing the number of available AI agents in the AI agent pool.

For example, a first tech stack 404A may be a RetinaNet tech stack, which is a one state object detection model architecture that is optimized for dense and small scale objects. A second tech stack 404B may be a you-only-look-once (YOLO) tech stack, which is a single stage object detection model with relatively quick training. Thus, some AI agents may be developed using RetinaNet models and tested, and provided with general AI training, with RetinaNet-specific techniques. Other AI agents may be developed using YOLO models, and tested or provided with general training, with YOLO specific techniques. However, while RetinaNet and YOLO are described here in as being two of the potential technology types associated with different tech stacks 404A . . . 404N, it should be understood that any type of technology may be used in a tech stack 404A . . . 404N, and that the number of tech stacks in the system 400 is not limited. For example, different tech stacks 404A . . . 404N may use other technology types for developing AI agents, such as faster regional CNN (faster R-CNN), single shot detector (SSD), deconvolutional single shot detector (DSSD), or another AI model or technology type. Additionally, multiple tech stacks 404A . . . 404N may use the same AI agents or technology types with different variations or features, such as faster R-CNN with feature pyramid networks (FPN), faster R-CNN by Google Research and Machine Intelligence (G-RMI), faster R-CNN with top down modulation (TDM), YOLOv2 or YOLOv3, or the like.

After the AI agents are developed and trained with general system training on a relevant tech stack 404A . . . 404N, the raw AI agents 410 may be included in an AI agent pool 422 for selection and use in a capability-based training element 412. The capability-based training element 412 may have one or more capability stacks 414A . . . 414N. Each capability stack 414A . . . 414N may include a machine teaching element 416, a validation element 418 and a system testing element 420, that provide capability specific training, validation of the training, and system testing of the validated AI agent. Once an AI agent is trained, and passes validation and system testing, the finalized, or validated and tested AI agent, may be stored in system storage 424 for subsequent use, production, or the like. Additionally, a copy of a trained AI agent may be stored in or included in, the AI agent pool 422 for later retraining with different capabilities.

A candidate AI agent may be selected from the AI agent pool 422 according to the AI agent training, the AI agent performance, the desired capabilities, or other factors. For example, an AI agent that exhibits superior aircraft recognition accuracy, whether as a result of general system training or capability-specific training, may be selected to be trained, or retrained, for formation flight where aircraft recognition would be important. In contrast, an AI agent that exhibits superior stationary object or small object recognition may be selected for training or retraining for tail rotor strike detection capability training where recognizing small, stationary objects like fences, overhead lines, tree branches, or the like, may be important.

In some embodiments, the AI agents in the AI agent pool 422, including the raw AI agents 410, and any previously trained AI agents, may have a same format, interface or other standardized features so that the AI agents work with the various capability stacks 414A . . . 414N, permitting the AI agents in the agent pool 442 and capability stacks 414A . . . 414N to be modular, or effectively interchangeable. This further permits the AI agents to be used with, or trained by, any capability stack 414A . . . 414N.

Each capability stack 414A . . . 414N is directed to training an AI agent from the AI agent pool 422 to have one or more particular capabilities. For example, capability stacks may be directed to providing training for tail rotor strike avoidance, formation flight, augmented reality (A/R) trade show support, A/R training support, vehicle automation or warning systems, or the like. Each capability stack 414A . . . 414N may have one or more parameters or capabilities on which an AI agent will be trained to achieve the desired capability. For example, a tail strike rotor capability stack may train an AI agent on small object and stationary object recognition to recognize fences, overhead lines, trees, buses, other aircraft, and the like, and to estimate distance to each small object with respect to a threshold or perimeter so that the AI agent may provide a signal when a recognized object is within a perimeter near a rotorcraft. In another example, the formation flight capability stack may train an AI agent to recognize airborne objects, and may train the AI agent to recognize particular aircraft as being part of a formation, and use the recognition and depth estimation to provide a signal used to adjust a drone's flight to mesh into a formation. In another example, an A/R trade show support capability stack may train an AI agent to operate on an A/R device, and to recognize models, or other trade show displays, and to work with a generative system to provide data displays, overlays with customized graphics, or the like, for display by the A/R device. In yet another example, the A/R training capability stack may train an AI agent to perform depth estimation and object recognition and gesture recognition to recognize object and actions by an A/R user to provide instruction or corrective data to the A/R user when working with a particular recognized item using recognized gestures or action.

In some embodiments, multiple capability stacks 414A . . . 414N may be configured to provide the same capabilities, or at least one same capability to a candidate AI agent. Thus, where multiple capability stacks 414A . . . 414N are duplicates, or directed to providing the same or overlapping capabilities, capability stacks 414A . . . 414N may be used to train different candidate AI agents with the same capabilities to determine which candidate AI agent performs the desired capabilities best, permitting multiple training pipes to be kicked off simultaneously. Additionally, the different capability stacks permit optimization of training resources. For example, where the capability stacks 414A . . . 414N are run on a cloud computing platform with flexible processing or memory resources, the different capability stacks may be run sequentially to prioritize a particular capability stack 414A . . . 414N, or to permit capability stacks to be run with greater or lesser resources based on, for example, resource pricing or availability, capability stack 414A . . . 414N or AI agent priority, or the like.

Figure 5:
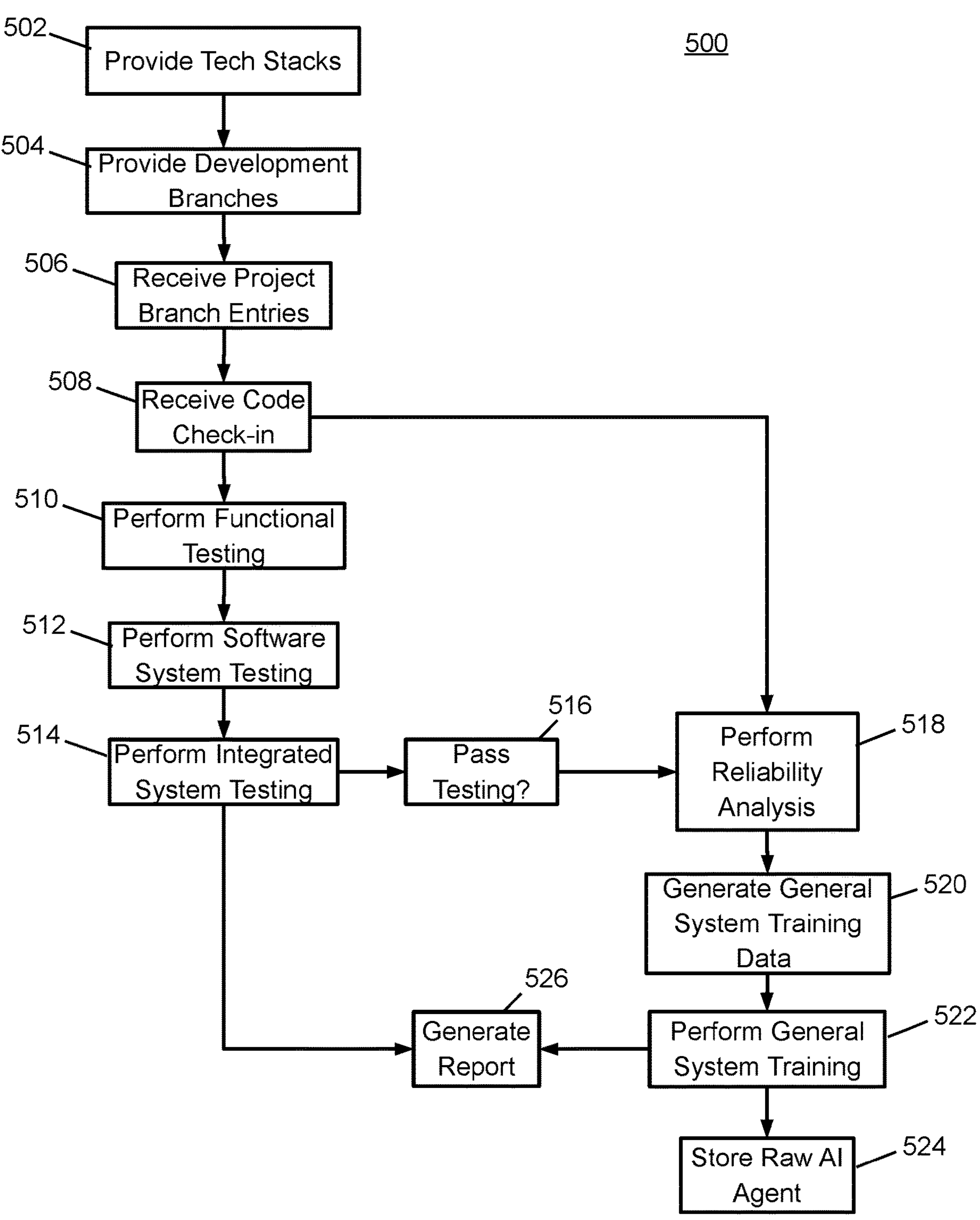
FIG. 5 is a flow diagram illustrating a method for development of AI-related systems and general system training for AI agents according to some embodiments.

FIG. 5 is a flow diagram illustrating a method 500 for development of AI-related systems and general system training for AI agents according to some embodiments. In some embodiments, a plurality of tech stacks is provided in block 502. Each tech stack is associated with development of an AI agent using a particular technology type. Additionally, different training of an AI agent may be associated with each tech stack, with each tech stack associated with development of AI agents using a selected technology type. This permits the training of AI agents to be tailored to the technology type. The plurality of tech stacks may use at least two different technology types. Thus, different tech stacks may use different technology types, permitting different AI agents to be developed within a same framework to generate programmatically interchangeable raw AI agents, and permit the tech stacks to be modular, and new tech stacks to be added.

In block 504, one or more development branches are provided. The development branches may include development environments, code, or supporting features such as libraries, or the like, where code for AI agents may be developed. In block 506, project branch entries is received. AI agent development assets from development branches may be collected or accumulated to generate a code base for AI agents. In block 508, code is received for check-in. The AI agent development assets may be stored or checked in to a code repository, code management system or like, and may be compiled, or otherwise used for providing an AI agent.

After a new AI agent is produced, the code or operation of the AI agent may be tested, and the AI trained with general system training to provide a raw AI agent. In some embodiments, in block 510, functional testing may be performed, with the functional testing being used to test the inputs of each agent element, such as a procedure, function, API call, executable, or the like, to ensure that the agent element performs according to design parameters. In block 512, system testing is performed. The system testing may include testing of overall software systems to ensure that once software elements are integrated, the software elements work properly together. In block 514, integrated system testing is performed. The integrated system testing may be used to test AI agent software with respect to potential host hardware platforms and overall system reliability. In block 526, one or more reports are generated. The repots may define capabilities, performance or other features of an AI agent determined during AI agent testing.

In block 516, the test status of the AI agent is determined, if the AI agent passes functional testing, software system testing and integrated system testing, the AI agent may be moved to general system training. Each tech stack may include elements or software for hosting an AI agent and providing general system training data to the hosted AI agent according to the technology type associated with the respective tech stack. In block 518, a reliability analysis is performed. The reliability analysis may be performed on checked-in code, after the software is compiled or the AI agent is developed into a runnable form, or after the AI agent passes testing. The reliability analysis may include analysis of at least one of robustness, reliability, sensitivity, stability, dependability or reliability characteristics, or the like, of the candidate AI agent to determine potential optimization of an AI agent during training, and may have an associated indication indicating optimization objectives for the AI agent during training.

In block 520, synthetic general system training data is generated. A tech stack may generate synthetic training data according to the technology type of the tech stack so that the synthetic training data is optimized, customized or otherwise fitted to the AI agent based on the technology type of the tech stack. Additionally, in some embodiments, one or more pieces of real data may be included in the general system training data, so that a pool of general system training data includes both synthetic and real training data.

In block 522, general system training is performed, and the general system training may generate a raw AI agent. The general system training may be performed on a tested, but untrained, AI agent using general system training data, and the system may train the tested and untrained AI agent in at least one of interaction with a particular hardware system, or recognition of basic objects, or may train the AI agent in another capability. In block 524, the raw AI agent is stored in, for example, a raw AI agent pool. Additionally, one or more reports may be generated in block 526 after the general system training is performed. In some embodiments, the reports may include information regarding training parameters, training results, performance, test results, or other features related to the AI agent trained with the general system training.

Figure 6:
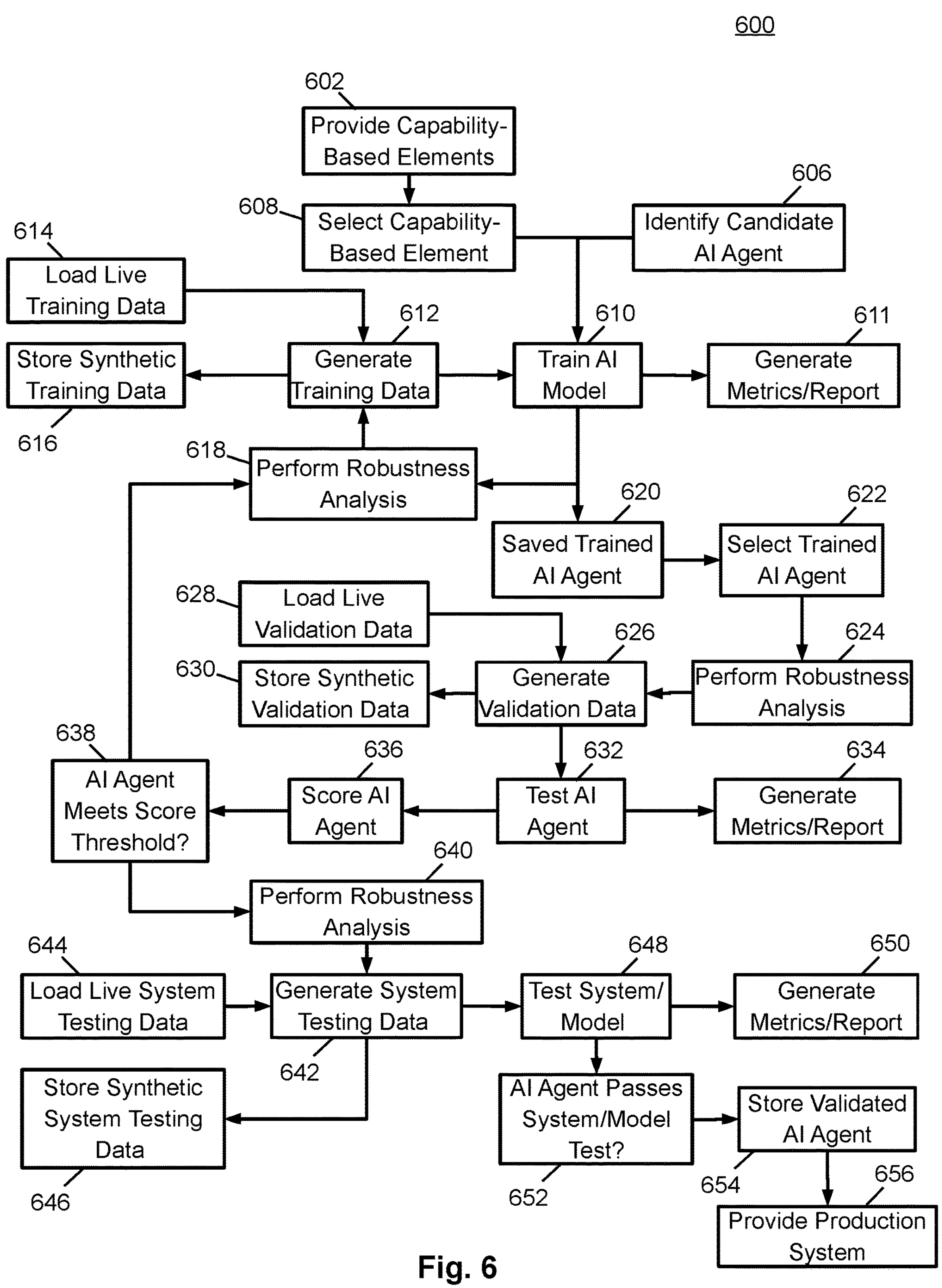
FIG. 6 is a flow diagram illustrating a method for capability-based training, validation and system testing for AI agents according to some embodiments.

FIG. 6 is a flow diagram illustrating a method 600 for capability-based training, validation and system testing for AI agents according to some embodiments. In block 602, capability based elements are provided. In some embodiments, the capability based elements may be capability stacks, with each capability stack associated with AI training for a set of capabilities. One or more capability stacks may be associated with a capability set for AI training that has a capability that is different from each capability of capabilities in capability sets of each other capability stack. Thus, the capability stacks may be modular, with capability stacks added as new capability stacks are developed, and multiple capability stacks able to simultaneously train different AI agents using the same, or different capability sets.

In block 608, the capability based element is selected. The selected capability-based element may be used for providing capability-based training for a candidate AI agent, and may be selected according to training or capability requirements required to generated the desired AI agent. Thus, in some embodiments, providing capability-based training includes providing capability based training for the candidate AI agent.

In block 606, a candidate AI agent is identified. In some embodiments, the candidate AI agent may be selected from an AI agent pool according to performance of the AI agent after previous training and capability requirements for the capability-based training. The previous training may be general system training of a raw AI agent, or may be capability specific training provided to develop a trained AI agent. Thus, in some embodiments, the AI agent pool includes one or more raw AI agents developed and trained with general system training through a tech stack of a plurality of tech stacks. Additionally, in some embodiments, the AI agent pool includes one or more validated AI agents trained with capability specific training by a capability stack of the plurality of capability stacks. This permits a previously trained AI agent to be retrained with additional or new capabilities.

In block 612, training data is generated. The training data may include synthetic data generated according to the capability set. In block 616, synthetic training data may be stored, and may be retained for alter review, reuse, analysis, for support of certification or for regulatory compliance, or for other uses. In some embodiments, the training data may also include real or live training data, and therefore, live training data may be loaded in block 614.

In block 612, the candidate AI agent is trained. In some embodiments, a trained AI agent is generated by training a candidate AI agent to have at least one capability associated with object recognition using first training data that includes the synthetic training data. Training the AI agent may include providing an execution environment and providing the training data to the AI agent for processing, and adjusting the biases and weights in the AI agent based on the loss, output, or other data generated by the AI agent as a result of processing the training data.

In block 618, a reliability analysis is performed on an AI agent undergoing training, or on a trained AI agent. In some embodiments, the reliability analysis is performed on an AI agent during training of the candidate AI agent for at least one capability. In some embodiments, the reliability analysis comprises analysis of at least one of robustness, reliability, sensitivity, stability, dependability, reliability characteristics, or another performance characteristic of the candidate AI agent during or after the training. Additionally, the synthetic training data generated in block 612 may be generated according to an indication associated with the reliability analysis indicating optimization objectives for the AI agent during training. The AI agent training, reliability analysis, and training data generation may be iterative, with the AI agent training using new training data generated according to at least the indication from the reliability analysis of training on previously generated training data. In block 611, one or more metrics or reports may be generated on the AI agent being trained. The reports or metrics may be reports on performance or results from training the AI agent, or may be a report on the training itself. Additionally, the report may be generated during the training, or after the training is completed.

After the AI agent is trained, the AI agent that was trained may be saved, in block 620, as a trained AI agent. In block 622, the trained AI agent may be selected for validation and system testing. The AI agent may be selected according to the metrics or report on the training, or may be simply automatically moved to validation and system testing.

In block 624, reliability analysis may be performed. In block 626, validation data is generated. In some embodiment, at least some validation data is synthetic validation data generated for a particular AI agent. The synthetic validation data may be different from the synthetic training data. The synthetic data may be stored after generation in block 630. In some embodiments, the validation data may also include live or real validation data, and may be loaded in block 628. Additionally, in some embodiments, the validation data, whether real or synthetic may be loaded or generated according to the reliability analysis and to provide an even data distribution across the capability set or data space associated with the AI agent training or capability set.

The trained AI agent may be validated by testing the AI agent in block 632. Validating the trained AI agent may include performing validation testing on the trained AI agent using validation data that includes the synthetic validation data. In block 634, one or more metrics or reports may be generated to indicate the result or validation testing, on the validation process itself, or on another aspect of the validation or AI agent performance.

In block 636, the AI agent may be scored. Scoring the AI agent may include assigning a measurable value to the performance of the AI during the validation testing. In block 638, the system may automatically determine whether the AI agent score meets a score threshold. If the AI agent has a score that does not meet a particular threshold, the validation testing may indicate that the AI agent needs additional capability specific training, or needs to be discarded, redeveloped, revised, or otherwise modified to improve one or more aspects of the AI agent software or model. If the AI agent does pass, or has a score that meets or exceeds a score threshold or other requirement, the AI agent may be passed to system testing.

Another reliability analysis may be performed in block 640 after the AI agent passes validation. The reliability analysis may be used to generate system testing data in block 642. The system testing may be used to test integration of the AI agent with a particular hardware system, such as a drone, vehicle, system, computer, or other execution environment that may potentially be intended for production. The system testing data may include synthetic data, which may be generated for a particular test. In block 646, the synthetic system testing data may be stored for review or analysis. In some embodiments, the system testing data may include real or live data, and in block 644, the live system testing data may be loaded. Additionally, the system testing data may be different from the training data and the validation data.

In block 648, system or model testing is performed. In some embodiments, system or model testing on the trained AI agent is performed after validating the AI agent and by testing the AI agent using the system testing data that includes the synthetic testing data. In some embodiments, the system or model testing is performed while the AI agent is integrated with a target hardware environment associated with hardware identified as a host system for the AI agent. In block 650, one or more metrics or reports may be generated for the AI agent system or model testing, and may indicate performance, test results, or other operational or performance parameters of the AI agent during the system testing.

The trained AI agent may be provided as a validated AI agent after the validation of the AI agent and after performing the system testing on the AI agent. In block 652, a system may automatically determine whether the AI agent passes the system or model test, and in block 654, the validated AI agent may be saved. If the AI agent passes the system or model test, the AI agent may be provided in a production system in block 656.

An embodiment system includes at least one processor, and at least one non-transitory computer readable memory connected to the at least one processor and including computer program code. The at least one non-transitory computer readable memory and the computer program code are configured, with the at least one processor, to cause the system to perform at least providing capability-based training for an artificial intelligence (AI) agent, where the cause the system to perform at least the providing the capability-based training includes cause the system to perform at least acquiring first training data, generating a trained artificial intelligence (AI) agent by training a candidate AI agent to have at least one capability associated with object recognition using the first training data, generating synthetic validation data different from the first training data, validating the trained AI agent by performing validation testing on the trained AI agent using first validation data that includes the synthetic validation data, generating one or more pieces of synthetic system testing data, performing system testing on the trained AI agent after validating the AI agent and by testing the AI agent, using first system testing data that includes the synthetic testing data and that is different from the first training data and the first validation data, while the AI agent is integrated with a target hardware environment associated with hardware identified as a host system for the AI agent, and providing the trained AI agent as a validated AI agent after the validating the AI agent and after performing the system testing on the AI agent.

In some embodiments, causing the system to perform providing the capability-based training is associated with a first capability stack that is associated with AI training for a first set of capabilities, and the first capability stack is a capability stack of a plurality of capability stacks of the system, where at least one capability stack of the plurality of capability stacks is associated with AI training for a second set of capabilities, and where at least one capability of the first set of capabilities is different from each capability of the second set of capabilities. In some embodiments, the at least one non-transitory computer readable memory and the computer program code are further configured, with the at least one processor, to cause the system to perform at least selecting, from an AI agent pool, the candidate AI agent, where the candidate AI agent is selected according to performance of the AI agent after previous training and capability requirements for the capability-based training, and where the causing the system to perform providing capability-based training for the AI agent includes causing the system to perform at least providing capability based training for the candidate AI agent. In some embodiments, the AI agent pool includes one or more raw AI agents developed, and trained with general system training, through a tech stack of a plurality of tech stacks. In some embodiments, the AI agent pool further includes one or more validated AI agents trained with capability specific training by a capability stack of the plurality of capability stacks, and the causing the system to perform generating the trained artificial intelligence (AI) agent includes causing the system to perform retraining a validated AI agent of the AI agent pool. In some embodiments, the at least one non-transitory computer readable memory and the computer program code are further configured, with the at least one processor, to cause the system to perform at least providing general system training for an AI agent, where the causing the system to perform providing the general system training includes causing the system to perform at least generating synthetic general system training data, and generating the raw AI agent by performing general system training on a tested untrained AI agent with general system training data that includes the synthetic general system training data, where the general system training includes training the tested and untrained AI in at least one of interaction with a particular hardware system, or recognition of basic objects. In some embodiments, causing the system to perform providing general system training for the AI agent is associated with a first tech stack that is associated with development of an AI agent using a first technology type of a plurality of technology types, and where the first tech stack is a tech stack of a plurality of tech stacks, each tech stack of the plurality of tech stacks being associated with development of an AI agent using a technology type of the plurality of technology types. In some embodiments, the at least one non-transitory computer readable memory and the computer program code are further configured, with the at least one processor, to cause the system to perform at least a reliability analysis on an AI agent during training of the candidate AI agent for the at least one capability, where the reliability analysis includes analysis of at least one of robustness, reliability, sensitivity, stability, dependability or reliability characteristics of the candidate AI agent during the training, and where the causing the system to perform acquiring the first training data includes causing the system to perform generating synthetic training data according to an indication that is associated with the reliability analysis and that is associated with optimization objectives for the AI agent during training.

Another embodiment system includes at least one processor, and at least one non-transitory computer readable memory connected to the at least one processor and including computer program code. The at least one non-transitory computer readable memory and the computer program code are configured, with the at least one processor, to cause the system to perform at least providing each capability stack of a plurality of capability stacks, where each capability stack provides capability-based training for an artificial intelligence (AI) agent, and where each capability stack of the plurality of capability stacks is associated with AI training for a respective set of capabilities, where the instructions for providing each capability stack include, for each capability stack, instructions for generating a trained AI agent by training a candidate AI agent using first training data, where the training the candidate AI agent include training the candidate AI agent to have at least one capability that is of the respective set of capabilities associated with the respective capability stack, and validating the trained AI agent by performing validation testing on the trained AI agent using first validation data that includes at least some synthetic validation data different from the training data, selecting an AI agent from an AI agent pool as a candidate AI agent according to performance of the AI agent after previous training, selecting an active capability stack from the plurality of capability stacks according to the set of capabilities associated with the active capability stack and capability requirements for capability based training needed for the candidate AI agent, and acquiring a validated AI agent by running the active capability stack for training of candidate AI agent on the set of capabilities.

In some embodiments, causing the system to perform providing each capability stack further includes, for each capability stack, causing the system to perform at least generating one or more pieces of synthetic system testing data, performing system testing on the trained AI agent after validating the AI agent and by testing the AI agent, using first system testing data that includes the synthetic system testing data, while the AI agent is integrated with a target hardware environment associated with hardware identified as a host system for the AI agent, and where the first system testing data is different from the first training data and the first validation data, and providing the trained AI agent as a validated AI agent after the validating the AI agent and after performing the system testing on the AI agent. In some embodiments, the first training data includes at least one of real data, synthetic training data, or a combination of synthetic training data and real data. In some embodiments, the AI agent pool includes one or more raw AI agents developed, and trained with general system training, through a tech stack of a plurality of tech stacks. In some embodiments, the AI agent pool further includes one or more validated AI agents trained with capability specific training by a capability stack of the plurality of capability stacks, and the causing the system to perform generating the trained AI agent includes causing the system to perform retraining a validated AI agent of the AI agent pool. In some embodiments, the at least one non-transitory computer readable memory and the computer program code are further configured, with the at least one processor, to cause the system to perform at least providing each tech stack of a plurality of tech stacks, where each tech stack of the plurality of tech stacks is associated with development of an AI agent using a technology type of a plurality of technology types, where each tech stack provides general system training for an AI agent, and where the causing the system to perform providing each tech stack include, for each tech stack, causing the system to perform at least generating a raw AI agent by performing general system training on a tested untrained AI agent system with training data that includes synthetic system training data, where the general system training includes training the tested and untrained AI in at least one of interaction with a particular hardware system, or recognition of basic objects. In some embodiments, the at least one non-transitory computer readable memory and the computer program code are further configured, with the at least one processor, to cause the system to perform at least performing a reliability analysis on an AI agent during training of the candidate AI agent for the at least one capability, where the reliability analysis includes analysis of at least one of robustness, reliability, sensitivity, stability, dependability or reliability characteristics of the candidate AI agent during the training, and where the synthetic training data includes the synthetic training data associated with an indication that is associated with the reliability analysis and that is associated with optimization objectives for the AI agent during training.

An embodiment method includes selecting an artificial intelligence (AI) agent from an AI agent pool as a candidate AI agent according to performance of the AI agent after previous training and further according to capability requirements for capability-based training, and providing the capability-based training for the candidate AI agent. Providing the capability-based training includes acquiring first training data, generating a trained artificial intelligence (AI) agent by training the candidate AI agent to have at least one capability associated with using the first training data, generating synthetic validation data different from the synthetic training data, validating the trained AI agent by performing validation testing on the trained AI agent using first validation data that includes the synthetic validation data, and providing the trained AI agent as a validated AI agent after the validating the AI agent.

In some embodiments, providing the capability-based training further includes generating one or more pieces of synthetic system testing data, and performing system testing on the trained AI agent after validating the AI agent and by testing the AI agent, using first system testing data that includes the synthetic testing data and that is different from the first training data and the first validation data, while the AI agent is integrated with a target hardware environment associated with hardware identified as a host system for the AI agent, and where the providing the trained AI agent as a validated AI agent includes providing the trained AI agent as a validated AI agent after the validating the AI agent and after performing the system testing on the AI agent. In some embodiments, the method further includes including providing a plurality of capability stacks, where the capability-based training is performed by a first capability stack that is of the plurality of capability stacks and that is associated with AI training for a first set of capabilities, and where at least one capability stack of the plurality of capability stacks is associated with AI training for a second set of capabilities, where at least one capability of the first set of capabilities is different from each capability of the second set of capabilities. In some embodiments, the AI agent pool includes one or more raw AI agents developed, and trained with general system training, through a tech stack of a plurality of tech stacks, and where the AI agent pool further includes one or more validated AI agents trained with capability specific training by a capability stack of the plurality of capability stacks. In some embodiments, the method further includes performing a reliability analysis on an AI agent during training of the candidate AI agent for the at least one capability, where the reliability analysis includes analysis of at least one of robustness, reliability, sensitivity, stability, dependability or reliability characteristics of the candidate AI agent during the training, and where the acquiring the first training data includes generating synthetic training data according to an indication that is associated with the reliability analysis and that is associated with optimization objectives for the AI agent during training.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A system, comprising:

at least one processor; and at least one non-transitory computer readable memory connected to the at least one processor and including computer program code, wherein the at least one non-transitory computer readable memory and the computer program code are configured, with the at least one processor, to cause the system to perform at least:

providing capability-based training for an artificial intelligence (AI) agent, wherein the cause the system to perform at least the providing the capability-based training includes causing the system to perform at least:

acquiring first training data;

generating a trained artificial intelligence (AI) agent by training the AI agent to have at least one capability using the first training data;

generating synthetic validation data different from the first training data;

validating the trained AI agent by performing validation testing on the trained AI agent using first validation data that includes the synthetic validation data;

generating one or more pieces of synthetic system testing data;

performing system testing on the trained AI agent after validating the trained AI agent and by testing the trained AI agent, using first system testing data that includes the synthetic testing data and that is different from the first training data and the first validation data, while the trained AI agent is integrated with a target hardware environment associated with hardware identified as a host system for the trained AI agent; and providing the trained AI agent as a first validated AI agent after the validating the trained AI agent and after performing the system testing on the trained AI agent.

2. The system of claim 1, wherein causing the system to perform providing the capability-based training is associated with a first capability stack that is associated with AI training for a first set of capabilities, and wherein the first capability stack is a capability stack of a plurality of capability stacks of the system, wherein at least one capability stack of the plurality of capability stacks is associated with AI training for a second set of capabilities, and wherein at least one capability of the first set of capabilities is different from each capability of the second set of capabilities.

3. The system of claim 2, wherein the at least one non-transitory computer readable memory and the computer program code are further configured, with the at least one processor, to cause the system to perform at least selecting, from an AI agent pool, the AI agent, wherein the AI agent is selected according to performance of the AI agent after previous training and capability requirements for the capability-based training; and wherein the causing the system to perform providing the capability-based training for the AI agent includes causing the system to perform at least the providing the capability-based training for the AI agent.

4. The system of claim 3, wherein the AI agent pool includes one or more raw AI agents developed, and trained with general system training, through a tech stack of a plurality of tech stacks.

5. The system of claim 4, wherein the AI agent pool further includes one or more validated AI agents trained with capability specific training by a capability stack of the plurality of capability stacks; and wherein the causing the system to perform generating the trained AI agent comprises causing the system to perform retraining a second validated AI agent of the AI agent pool.

6. The system of claim 4, wherein the at least one non-transitory computer readable memory and the computer program code are further configured, with the at least one processor, to cause the system to perform at least:

providing general system training for at least one AI agent, wherein the causing the system to perform providing the general system training includes causing the system to perform at least:

generating synthetic general system training data; and generating the one or more raw AI agents by performing general system training on a tested untrained AI agent with general system training data that includes the synthetic general system training data, wherein the general system training comprises training the tested untrained AI agent in at least one of interaction with a particular hardware system, or recognition of basic objects.

7. The system of claim 6, wherein the causing the system to perform providing general system training for the at least one AI agent is associated with a first tech stack that is associated with development of an AI agent using a first technology type of a plurality of technology types, and wherein the first tech stack is a tech stack of the plurality of tech stacks, each tech stack of the plurality of tech stacks being associated with development of at least one AI agent using a technology type of the plurality of technology types.

8. The system of claim 1, wherein the at least one non-transitory computer readable memory and the computer program code are further configured, with the at least one processor, to cause the system to perform at least a reliability analysis on an AI agent during training of the AI agent for the at least one capability, wherein the reliability analysis comprises analysis of at least one of robustness, reliability, sensitivity, stability, dependability or reliability characteristics of the AI agent during the training; and wherein the causing the system to perform acquiring the first training data includes causing the system to perform generating synthetic training data according to an indication that is associated with the reliability analysis and that is associated with optimization objectives for the AI agent during training.

9. A system, comprising:

at least one processor; and at least one non-transitory computer readable memory connected to the at least one processor and including computer program code, wherein the at least one non-transitory computer readable memory and the computer program code are configured, with the at least one processor, to cause the system to perform at least:

providing each capability stack of a plurality of capability stacks, wherein each capability stack provides capability-based training for an artificial intelligence (AI) agent, and wherein each capability stack of the plurality of capability stacks is associated with AI training for a respective set of capabilities, wherein the providing each capability stack includes:

generating a trained AI agent by training the AI agent using first training data, wherein the training the AI agent includes training the AI agent to have at least one capability that is of the respective set of capabilities associated with the respective capability stack; and validating the trained AI agent by performing validation testing on the trained AI agent using first validation data that includes at least some synthetic validation data different from the first training data;

selecting the AI agent from an AI agent pool according to performance of the AI agent after previous training;

selecting an active capability stack from the plurality of capability stacks according to the set of capabilities associated with the active capability stack and capability requirements for capability based training needed for the AI agent; and acquiring a first validated AI agent by running the active capability stack for training of the AI agent on the set of capabilities.

10. The system of claim 9, wherein the causing the system to perform providing each capability stack further includes, for each capability stack, causing the system to perform at least:

generating one or more pieces of synthetic system testing data;

performing system testing on the trained AI agent after validating the AI agent and by testing the AI agent, using first system testing data that includes the synthetic system testing data, while the AI agent is integrated with a target hardware environment associated with hardware identified as a host system for the AI agent, and wherein the first system testing data is different from the first training data and the first validation data; and providing the trained AI agent as a validated AI agent after the validating the AI agent and after performing the system testing on the AI agent.

11. The system of claim 9, wherein the first training data comprises at least one of real data, synthetic training data, or a combination of synthetic training data and real data.

12. The system of claim 9, wherein the AI agent pool includes one or more raw AI agents developed, and trained with general system training, through a tech stack of a plurality of tech stacks.

13. The system of claim 12, wherein the AI agent pool further includes one or more validated AI agents trained with capability specific training by a capability stack of the plurality of capability stacks; and wherein the causing the system to perform generating the trained AI agent comprises causing the system to perform retraining a second validated AI agent of the AI agent pool.

14. The system of claim 12, wherein the at least one non-transitory computer readable memory and the computer program code are further configured, with the at least one processor, to cause the system to perform at least:

providing each tech stack of the plurality of tech stacks, wherein each tech stack of the plurality of tech stacks is associated with development of an AI agent using a technology type of a plurality of technology types, wherein each tech stack provides general system training for at least one AI agent, and wherein the causing the system to perform providing each tech stack includes, for each tech stack, causing the system to perform at least:

generating a raw AI agent by performing general system training on a tested untrained AI agent with training data that includes synthetic system training data, wherein the general system training comprises training the tested untrained AI agent in at least one of interaction with a particular hardware system, or recognition of basic objects.

15. The system of claim 9, wherein the at least one non-transitory computer readable memory and the computer program code are further configured, with the at least one processor, to cause the system to perform at least performing a reliability analysis on an AI agent during training of the AI agent for the at least one capability, wherein the reliability analysis comprises analysis of at least one of robustness, reliability, sensitivity, stability, dependability or reliability characteristics of the AI agent during the training; and wherein the first training data includes synthetic training data associated with an indication that is associated with the reliability analysis and that is associated with optimization objectives for the AI agent during training.

16. A method, comprising:

selecting an artificial intelligence (AI) agent from an AI agent pool according to performance of the AI agent after previous training and further according to capability requirements for capability-based training; and providing the capability-based training for the AI agent, wherein the providing the capability-based training includes:

acquiring first training data comprising synthetic training data;

generating a trained artificial intelligence (AI) agent by training the AI agent to have at least one capability associated with using the first training data;

generating synthetic validation data different from the synthetic training data;

validating the trained AI agent by performing validation testing on the trained AI agent using first validation data that includes the synthetic validation data; and providing the trained AI agent as a validated AI agent after the validating the AI agent.

17. The method of claim 16, wherein the providing the capability-based training further comprises:

generating one or more pieces of synthetic testing data; and performing system testing on the trained AI agent after validating the AI agent and by testing the AI agent, using first system testing data that includes the synthetic testing data and that is different from the first training data and the first validation data, while the AI agent is integrated with a target hardware environment associated with hardware identified as a host system for the AI agent; and wherein the providing the trained AI agent as a validated AI agent comprises:

providing the trained AI agent as a validated AI agent after the validating the AI agent and after performing the system testing on the AI agent.

18. The method of claim 16, further comprising providing a plurality of capability stacks;

wherein the capability-based training is performed by a first capability stack that is of the plurality of capability stacks and that is associated with AI training for a first set of capabilities, and wherein at least one capability stack of the plurality of capability stacks is associated with AI training for a second set of capabilities, wherein at least one capability of the first set of capabilities is different from each capability of the second set of capabilities.

19. The method of claim 18, wherein the AI agent pool includes one or more raw AI agents developed, and trained with general system training, through a tech stack of a plurality of tech stacks; and wherein the AI agent pool further includes one or more validated AI agents trained with capability specific training by a capability stack of the plurality of capability stacks.

20. The method of claim 16, further comprising performing a reliability analysis on an AI agent during training of the AI agent for the at least one capability, wherein the reliability analysis comprises analysis of at least one of robustness, reliability, sensitivity, stability, dependability or reliability characteristics of the AI agent during the training; and wherein the acquiring the first training data comprises generating synthetic training data according to an indication that is associated with the reliability analysis and that is associated with optimization objectives for the AI agent during training.

* * * * *